(12) United States Patent
Silverstein et al.

(10) Patent No.: US 12,577,172 B2
(45) Date of Patent: Mar. 17, 2026

(54) VAPOR-MEDIATED SYNTHESIS OF SILICON CARBIDE MATRICES FOR CERAMIC MATRIX COMPOSITES BY REACTIVE MELT INFILTRATION

(71) Applicant: The Regents of the University of California, Oakland, CA (US)

(72) Inventors: Ravit Silverstein, Golea, CA (US); Frank W. Zok, Goleta, CA (US); Carlos G. Levi, Santa Barbara, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 18/258,148

(22) PCT Filed: Dec. 20, 2021

(86) PCT No.: PCT/US2021/064417
§ 371 (c)(1),
(2) Date: Jun. 16, 2023

(87) PCT Pub. No.: WO2022/150184
PCT Pub. Date: Jul. 14, 2022

(65) Prior Publication Data
US 2024/0034686 A1 Feb. 1, 2024

Related U.S. Application Data

(60) Provisional application No. 63/127,773, filed on Dec. 18, 2020.

(51) Int. Cl.
*C04B 35/80* (2006.01)
*C04B 35/628* (2006.01)
(Continued)

(52) U.S. Cl.
CPC ........ *C04B 35/80* (2013.01); *C04B 35/62863* (2013.01); *C04B 35/62884* (2013.01);
(Continued)

(58) Field of Classification Search
CPC .... B32B 18/00; C04B 35/62863; C04B 35/80
See application file for complete search history.

(56) References Cited

U.S. PATENT DOCUMENTS

| | | | |
|---|---|---|---|
| 6,403,158 B1 * | 6/2002 | Corman | C23C 10/20 |
| | | | 427/427 |
| 10,954,167 B1 * | 3/2021 | Garnier | C04B 35/62842 |

(Continued)

FOREIGN PATENT DOCUMENTS

WO      2022150184      7/2022

OTHER PUBLICATIONS

Zok, F.W., "Ceramic-matrix composites enable revolutionary gains in turbine engine efficiency", American Ceramic Society Bulletin, 2016, pp. 22-28, vol. 95, No. 5.

(Continued)

*Primary Examiner* — Tabassom Tadayyon Eslami
(74) *Attorney, Agent, or Firm* — GATES & COOPER LLP

(57) ABSTRACT

A two-step synthesis of SiC including initial exposure of carbon surfaces to Si vapor, followed by Si melt infiltration, is described herein. Interrupted differential thermal analysis (DTA) of amorphous C and Si powder mixtures and microstructure characterization are used to identify the stages of the reaction. Exposure to Si vapor yields a SiC layer with nanoscale porosity driven by the volume change associated with the reaction. This forms a continuous pore network that promotes subsequent melt access to the reaction front with the C. While the pores remain open, the vapor phase reaction proceeds at a nearly-constant rate and exhibits a strong (Continued)

temperature sensitivity, the latter due largely to the temperature sensitivity of the Si vapor pressure. The implications for enhancing the reactive melt infiltration process and fabrication of SiC matrices for ceramic composites are discussed.

15 Claims, 15 Drawing Sheets

(51) Int. Cl.
    *C04B 35/65*     (2006.01)
    *C04B 35/657*     (2006.01)
(52) U.S. Cl.
    CPC ........ *C04B 35/62886* (2013.01); *C04B 35/65* (2013.01); *C04B 35/657* (2013.01); *C04B 2235/3826* (2013.01); *C04B 2235/422* (2013.01); *C04B 2235/5244* (2013.01); *C04B 2235/5248* (2013.01); *C04B 2235/5252* (2013.01); *C04B 2235/614* (2013.01); *C04B 2235/616* (2013.01); *C04B 2235/6567* (2013.01); *C04B 2235/78* (2013.01)

(56) References Cited

U.S. PATENT DOCUMENTS

| | | | |
|---|---|---|---|
| 2002/0109250 A1 | 8/2002 | Kim et al. | |
| 2007/0126292 A1 | 6/2007 | Lugg | |
| 2013/0167374 A1* | 7/2013 | Kirby .................... | H04W 4/023 |
| | | | 428/317.9 |
| 2017/0145560 A1* | 5/2017 | Weaver ................... | C04B 41/52 |

OTHER PUBLICATIONS

Naslain, R., "Design, preparation and properties of non-oxide CMCs for application in engines and nuclear reactors: an overview", Composites Science and Technology, 2004, pp. 155-170, vol. 64.

Corman, G.S., et al., "Rig and Engine Testing of Melt Infiltrated Ceramic Composites for Combustor and Shroud Applications", Journal of Engineering for Gas Turbines and Power, Jul. 2002, pp. 459-464, vol. 124.

Naslain, R.R., "SiC-Matrix Composites: Nonbrittle Ceramics for Therm •• Structural Application", International Journal of Applied Ceramic Technology, 2005, pp. 75-84, vol. 2, No. 2.

Nannetti, C.A., et al., "Manufacturing SiC-Fiber-Reinforced SiC Matrix Composites by Improved CVI/Slurry Infiltration/Polymer Impregnation and Pyrolysis", Journal of American Ceramic Society, 2004, pp. 1204-1209, vol. 87, No. 7.

Reitz, R.B., et al., "Reactive alloy melt infiltration for SiC composite matrices: Mechanistic insights", Journal of American Ceramic Society, 2017, pp. 5471-5481, vol. 100.

Margiotta, J.C., et al., "Formation of dense silicon carbide by liquid silicon infiltration of carbon with engineered structure", J. Mater. Res., 2008, pp. 1237-1248, vol. 23, No. 5.

Singh, M., et al., "Reactive melt infiltration of silicon-molybdenum alloys into microporous carbon preforms", Materials Science and Engineering A, 1995, pp. 193-200, vol. 194.

Reitz, R.B., "Fundamentals of Reactive Alloy Melt Infiltration for Robust SiC/SiC Ceramic Matrix Composites", A dissertation submitted in partial satisfaction of the requirements for the degree of Doctor of Philosophy in Materials, University of California, Santa Barbara, 2018, pp. 1-189.

Serp, P., "Carbon", Comprehensive Inorganic Chemistry II, Elsevier Ltd., 2013, pp. 323-369.

Schamm, S., et al., "HREM identification of "one-dimensionally-disordered" polytypes in the SiC (CVI) matrix of SiC/SiC composites", Microsc. Microanal Microstruct., 1991, pp. 59-73, vol. 2.

Zhou, H., et al., "Kinetics Model for the Growth of Silicon Carbide by the Reaction of Liquid Silicon with Carbon", Journal of American Ceramic Society, 1995, pp. 2456-2462, vol. 78.

Margiotta, J.C., et al., "Microstructural evolution during silicon carbide (SiC) formation by liquid silicon infiltration using optical microscopy", Int. Journal of Refractory Metals & Hard Materials, 2010, pp. 191-197, vol. 28.

Voytovych, R., et al., "Reactivity between liquid Si or Si alloys and graphite", Journal of the European Ceramic Society, 2012, pp. 3825-3835, vol. 32.

Sangsuwan, S., et al., "Reaction-Bonded Silicon Carbide by Reactive Infiltration", Ind. Eng. Chem. Res., 2001, pp. 5191-5198, vol. 40.

Davis, S.G., et al., "Vapor Pressure of Silicon and the Dissociation Pressure of Silicon Carbide", J. Chem. Phys., 1961, pp. 659-664, vol. 34.

Bale, C.W., et al., "FactSage thermochemical software and databases, 2010-2016", CALPHAD: Computer Coupling of Phase Diagrams and Thermochemistry, 2016, pp. 35-53, vol. 54.

Messner, R.P., et al., "Liquid-Phase Reaction-Bonding of Silicon Carbide Using Alloyed Silicon-Molybdenum Melts", Journal of American Ceramic Society, 1990, pp. 1193-1200, vol. 73, No. 5.

Poerschke, D.L., et al., "Yttrium Bearing Silicon Carbide Matrices for Robust Ceramic Composites", Journal of American Ceramic Society, 2013, pp. 1300-1308, vol. 96, No. 4.

Monthioux, M., et al., "Thermal Behavior of (Organosilicon) Polymer-Derived Ceramics. V: Main Facts and Trends", Journal of the European Ceramic Society, 1996, pp. 721-131, vol. 16.

Corman, G.S., et al., "Silicon Melt Infiltrated Ceramic Composites (HiPerCompTH)", Handbook of Ceramic Composites, New York, 2005, pp. 99-115.

PCT International Search Report & Written Opinion dated Jul. 28, 2022 for PCT Application No. PCT/US2021/064417.

Silverstein, R., et al., "Vapor-mediated melt infiltration for synthesizing SiC composite matrices", Journal of the American Ceramic Society, 2021, pp. 3833-3844, vol. 104, Issue 8.

* cited by examiner

VAPOR-MEDIATED SYNTHESIS OF SILICON CARBIDE MATRICES FOR CERAMIC MATRIX COMPOSITES BY REACTIVE MELT INFILTRATION

CROSS REFERENCE TO RELATED APPLICATIONS

This application claims the benefit under 35 U.S.C. Section 119(e) of the following co-pending and commonly-assigned application:

U.S. Provisional Application Ser. No. 63/127,773, filed on Dec. 18, 2020, by Ravit Silverstein, Frank W. Zok, and Carlos G. Levi, entitled "VAPOR-MEDIATED SYNTHESIS OF SILICON CARBIDE MATRICES FOR CERAMIC MATRIX COMPOSITES BY REACTIVE MELT INFILTRATION,"; which application is incorporated by reference herein.

STATEMENT REGARDING FEDERALLY SPONSORED RESEARCH AND DEVELOPMENT

This invention was made with Government support under Grant (or Contract) No. N00014-17-1-2276, axvarded by the Office of Naval Research. The Government has certain rights in this invention.

BACKGROUND OF THE INVENTION

1. Field of the Invention

The present disclosure relates to Silicon Carbide (SiC) ceramic matrix composites (C MCs) and methods of making the same.

2. Description of the Related Art (Note: This application references a number of different publications as indicated throughout the specification by one or more reference numbers in brackets, e.g., [x]. A list of these different publications ordered according to these reference numbers can be found below in the section entitled "References." Each of these publications is incorporated by reference herein.) SiC-based CMCs offer low density, can be designed for high strength and toughness, and are able to withstand higher temperatures when suitably coated, making them attractive materials for aircraft propulsion and power generation systems [1]. Advanced SiC fibers can yield composites with temperature capabilities of up to ~1500° C. [2], with concomitant enhancement of the turbine inlet temperature and efficiency. While fibers are critical to the mechanical performance of the CMC, the SiC matrix is essential in enabling load transfer among fibers and in protecting them from the environment [3]. For the matrix to perform its function optimally, however, it must be dense and possess a minimum number-density of flaws, ideally below a critical size; these attributes are difficult to achieve with current composite fabrication processes.

Incorporation of the SiC matrix into a fiber preform (previously coated to attain desirable interface properties) often occurs in stages. In the first, a porous matrix is produced through a combination of slurry infiltration and chemical vapor infiltration (CVI) [4, 5] or through precursor polymer infiltration and pyrolysis (PIP) [6]. Densification is then achieved by molten Si infiltration [3, 5], but the ensuing Si phase limits the temperature capability of the matrix to a level well below that of the fibers. A path to circumvent this problem involves incorporating C in the matrix prior to melt infiltration with the goal of forming additional SiC upon contact with the Si melt, a process known as reactive melt infiltration (RMI) [2, 5]. A variant on the latter approach involves use of a Si alloy wherein the alloying element combines with the residual Si (that remaining after consumption of C) in the form of a high temperature silicide. This approach has the potential to increase the temperature capability of the matrix [7-9].

Previous studies on the mechanisms of Si and Si alloy infiltration in porous carbonaceous preforms identified three issues that may limit the extent of penetration and, by extension, the thickness of composite that may be densified in this manner [7-9]. First, since molten Si does not naturally wet C surfaces, inward melt flow into a porous network is controlled by reactive wetting wherein the surface must be modified first to form SiC before it can be wetted by the melt. Second, behind the leading melt front, SiC continues to form and constrains the flow, eventually choking the infiltration at the narrowest necks in the pore network [7-9]. Third, when alloys are designed to form refractory intermetallics following partial removal of the Si to form SiC, the emerging silicide may also block the melt flow, even if the pores are larger than those that would prevent choking with (pure) Si melts [10]. New strategies are thus needed to improve infiltration rate, mitigate choking and eliminate residual Si from the matrix. The present invention satisfies this need.

SUMMARY OF THE INVENTION

The present invention addresses an important problem in the synthesis of dense silicon carbide (SiC) matrices for ceramic matrix composites (CMCs). The typical process involves infiltration of molten Si into a fiber preform containing carbon and reaction of the Si with the carbon to form SiC. A crucial hindrance is that molten Si does not readily wet carbon. Consequently, the rate of infiltration is controlled by the rather slow formation of a thin SiC layer on the carbon surface ahead of the melt front. Once wetting occurs the reaction proceeds relatively rapidly. But during the infiltration process the SiC product can fill the narrower spaces in the porous network, choking the flow and limiting the thicknesses that can be infiltrated.

The present invention uses Si vapor generated from embedded particles or an external source to precondition the internal surfaces of the carbon component of the matrix preform by forming a thin layer of SiC that can be wetted by a Si-alloy melt introduced in a subsequent step. A corollary is that the SiC from the vapor reaction grows slowly so there is no blockage of the narrow flow passages. As a result, the pore space can be filled entirely by the reactive melt after preconditioning of the surface and the reaction with the rest of the C can be completed subsequently and uniformly over the entire preform.

Pre-conditioning can be performed at temperatures below those at which significant fiber degradation occurs. Moreover, by proper selection of the Si-alloy melt for subsequent infiltration, the process temperature can be reduced and any residual Si could be captured in a high temperature silicide, thereby enhancing the temperature capability of the resulting CMC.

Methods according to the present invention can be embodied in many ways including, but not limited to, the following.

1. A method of making a silicon carbide matrix, comprising:
   exposing internal surfaces of a porous composite preform, comprising carbon, to a vapor comprising silicon, wherein:
   the carbon in the preform comprises carbon particles or solid carbon derived from pyrolysis of a liquid precursor;
   the silicon vapor adsorbs on the carbon surfaces and reacts with the carbon so as to form a (e.g., nanoporous, e.g., thin) layer of silicon carbide on the carbon; and
   a majority of the carbon under the nanoporous (e.g., thin) SiC layer remaining after the vapor reaction being available for a subsequent reaction with a Si bearing melt;
   exposing the carbon preform surfaces modified with the nanoporous (e.g., thin) SiC layer to the reactive melt comprising molten silicon, wherein the reactive melt infiltrates first the network of larger pores (passages) in the porous composite preform carbon preform so as to wet or contact the silicon carbide on the inner surfaces of the pores and then through a network of nanopores in the nanoporous (e.g., thin) SiC layer to react with the majority of the carbon so as to form additional silicon carbide at the interfaces with the remaining carbon and eventually filling the entire network of pores including the pores in the network of nanopores.

2. The method of example 1, further comprising:
   assembling the porous composite preform including, in the preform, SiC fibers, and a SiC particulate filler combined with the carbon particles, wherein the porous composite preform comprises the larger pores, comprising interconnected passages, for the permeation of the Si vapor.

3. The method of example 2, wherein the porous composite preform further comprises silicon particles, the method further comprising heating the porous body so as to vaporize the silicon particles and form the vapor.

4. The method of example 1, wherein the carbon comprises amorphous carbon, graphitic carbon or turbostratic carbon derived from pyrolysis of carbon precursors such as, for example, resins or pitch.

5. The method of any of the examples 1-4, wherein:
   the vapor comprises pure silicon and the melt comprises a Si-based alloy wherein silicon is the major component of the alloy.

6. The method of example 1, wherein the vapor is provided from an external source or by vaporizing discrete small silicon particles incorporated in the preform.

7. The method of any of the examples 1-6, wherein:
   the network of pores comprising nanopores are formed within the thin SiC layers on the carbon surfaces by volume contraction resulting from the carbon reacting with the vapor; and
   the nanopores interpenetrate the silicon carbide layer initially formed from the vapor reaction and are connected to the interface with the carbon remaining available for the reaction with the reactive melt.

8. The method of any of the examples 1-7, further comprising controlling a reaction rate of the vapor with the carbon surfaces so as to form the network of nanopores while preventing the silicon carbide synthesized from the vapor reaction from blocking the pores, (which is associated with a critical thickness corresponding to the plateau in FIG. 10) allowing passage of the reactive melt through the pores to access the majority of carbon that has not reacted with the silicon in the vapor.

9. The method of example 8, wherein controlling the reaction rate comprises controlling a temperature of the vapor phase reaction so as to expose the outer surfaces to the vapor at one or more temperatures below a melting temperature of the silicon and for a duration, such that a thickness of the silicon carbide synthesized using the vapor does not block the pores.

10. The method of example 9, wherein the temperature is 20-100K below the melting temperature of the silicon, wherein for the temperature of 20K the duration is 2 hours or less and for the temperature of 100 K the duration is 4 hours or less.

11. The method of any of the examples 1-10, further comprising controlling the oxygen content (typically at very low levels) in the environment to promote the formation of SiO (monoxide) gas by reaction with the solid Si, which can contribute to the availability of Si reactant in the vapor phase that reaches the C surfaces; and
   reducing the temperature by taking into account reaction of the carbon with the silicon in the silicon monoxide vapor.

12. The method of any of the examples 1-11, wherein:
   the vapor uniformly infiltrates an entirety of the passages in the porous carbon bearing preform through interconnections between the passages, and
   the melt uniformly infiltrates an entirety of the pores in the porous layer created by the reaction with the vapor through interconnections between the network of pores.

13. The method of any of the examples 1-12, wherein the nanoporous layer comprises elongated grains of silicon carbide bounding the network of nanopores.

14. The method of example 13, wherein the elongated grains have average widths in the range of 100 nm-200 nm and an aspect ratio approximately in a range of 8-12.

15. The method of examples 13 or 14, wherein the elongated grains comprise arrays of randomly spaced stacking faults separated by spacings of 10 nanometers or less.

16. A silicon carbide matrix manufactured using the method of any of the examples 1-15.

17. The method of any of the examples 1-16, further comprising forming a SiC-based ceramic matrix composite (CMC) using the silicon carbide matrix, wherein the composite comprises ceramic fibers combined with the matrix.

18. A silicon carbide matrix, comprising:
   silicon carbide comprising:
   vapor synthesized silicon carbide comprising grains of silicon carbide formed by a reaction of carbon in solid form with a vapor comprising silicon and leaving unreacted carbon; and
   reactive melt synthesized silicon carbide formed at the interface between any previous SiC layer and the residual carbon remaining from the vapor-conditioning stage, the reactive melt synthesized silicon carbide formed by infiltration of the molten silicon to the unreacted carbon and reaction of molten silicon with the unreacted carbon.

19. An intermediate state of the silicon carbide matrix of example 18, further comprising a minor fraction of channels or pockets consisting essentially of silicon, wherein the channels or pockets are separated by or interspersed with the silicon carbide comprising elongated silicon carbide grains.

20. The silicon carbide matrix of example 19, wherein the residual channels are non-percolating or non-interconnected channels and any pockets are isolated by the surrounding SiC.

21. The silicon matrix of example 19, wherein the channels comprise reactive melt infiltration paths of the molten silicon from the boundary between the original pore space and the outer surfaces of the vapor-generated silicon carbide to locations of the unreacted carbon inside the silicon carbide.

22. The matrix of any of the examples 19-21, wherein the channels each have a diameter of 1-100 nm.

23. The matrix of any of the examples 21-22, wherein the paths are formed by the infiltration of the reactive melt into a network of nanopores in the vapor synthesized silicon carbide, the network of nanopores formed during the reaction with the vapor and connected to the unreacted carbon after the reaction with the vapor.

24. The matrix of example 24, wherein the nanopores are between grains of the vapor synthesized silicon carbide and further propagated during the melt reaction with the residual carbon.

25. The matrix of examples 24 or 25, wherein nanopores have diameters or widths in a range of 1-100 nm and the elongated silicon carbide grains are formed or continue to grow on the previously formed grains of the vapor synthesized silicon carbide by the reaction of the molten silicon with the unreacted carbon remaining after the reaction with the vapor.

26. The matrix of any of the examples 18-25, wherein the silicon carbide (including vapor synthesized silicon carbide and reactive melt synthesized silicon carbon) comprise the elongated grains of faulted crystalline silicon carbide or elongated grains of silicon carbide containing crystallographic planar flaws including stacking faults and twin boundaries.

27. The matrix of any of the examples 19-26, wherein the matrix comprises less than 5% residual carbon and less than 5% residual silicon, e.g., after reaction is completed.

28. A composite comprising ceramic fibers embedded in the ceramic matrix.

29. A combustor liner or turbine component comprising the composite of example 28, the turbine comprising any or all of the following components: a turbine shroud, turbine vane, or turbine blade.

30. An (e.g., electricity/industrial) power generation plant or aircraft engine comprising the combustor liner and/or any of the turbine components of example 29.

31. The method or matrix of any of the examples, wherein the melt flow comes in first through the larger pores/passages in the preform, but then through the nanopores in the vapor-synthesized SiC layer. In one or more examples, the reaction with the melt is controlled until the macroscopic infiltration through the larger pores into the entire preform (fibers and matrix) is completed to avoid choking. In one or more examples, once large scale infiltration is completed, the vapor synthesized layer may break down and allow direct contact of the bulk melt with the residual carbon.

BRIEF DESCRIPTION OF THE DRAWINGS

Referring now to the drawings in which like reference numbers represent corresponding parts throughout.

DETAILED DESCRIPTION OF THE INVENTION

Figure 1:
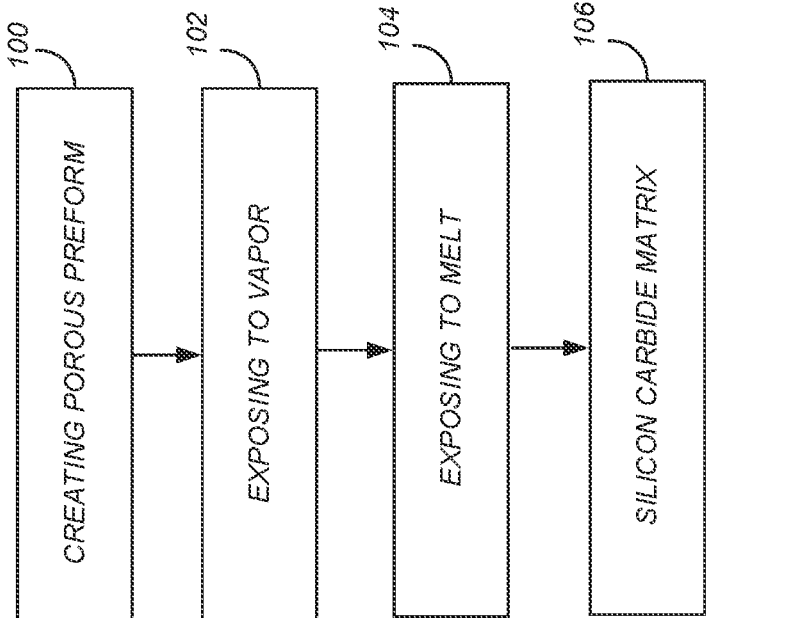
FIG. 1. Flowchart illustrating a method of making a silicon carbide matrix according to one or more examples.

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.
Technical Description
The present disclosure reports on the formation of SiC by reaction of C with Si vapor and the subsequent interaction with Si melts, as needed for implementation of vapor-mediated melt infiltration into a CMC fabrication process.
Example Process Steps
FIG. 1 illustrates a method of making a silicon carbide matrix according to one or more embodiments.

Block 100 represents creation or assembly of a porous composite preform containing SiC fibers and carbon in the form of particles or derived from pyrolysis of a liquid precursor. In various examples, carbon which may be formed by pyrolysis of precursors could be in the form of "flakes" or "slivers" that may be amorphous or partially crystalline.

Figures 2A, 2B, 2C, 2D:
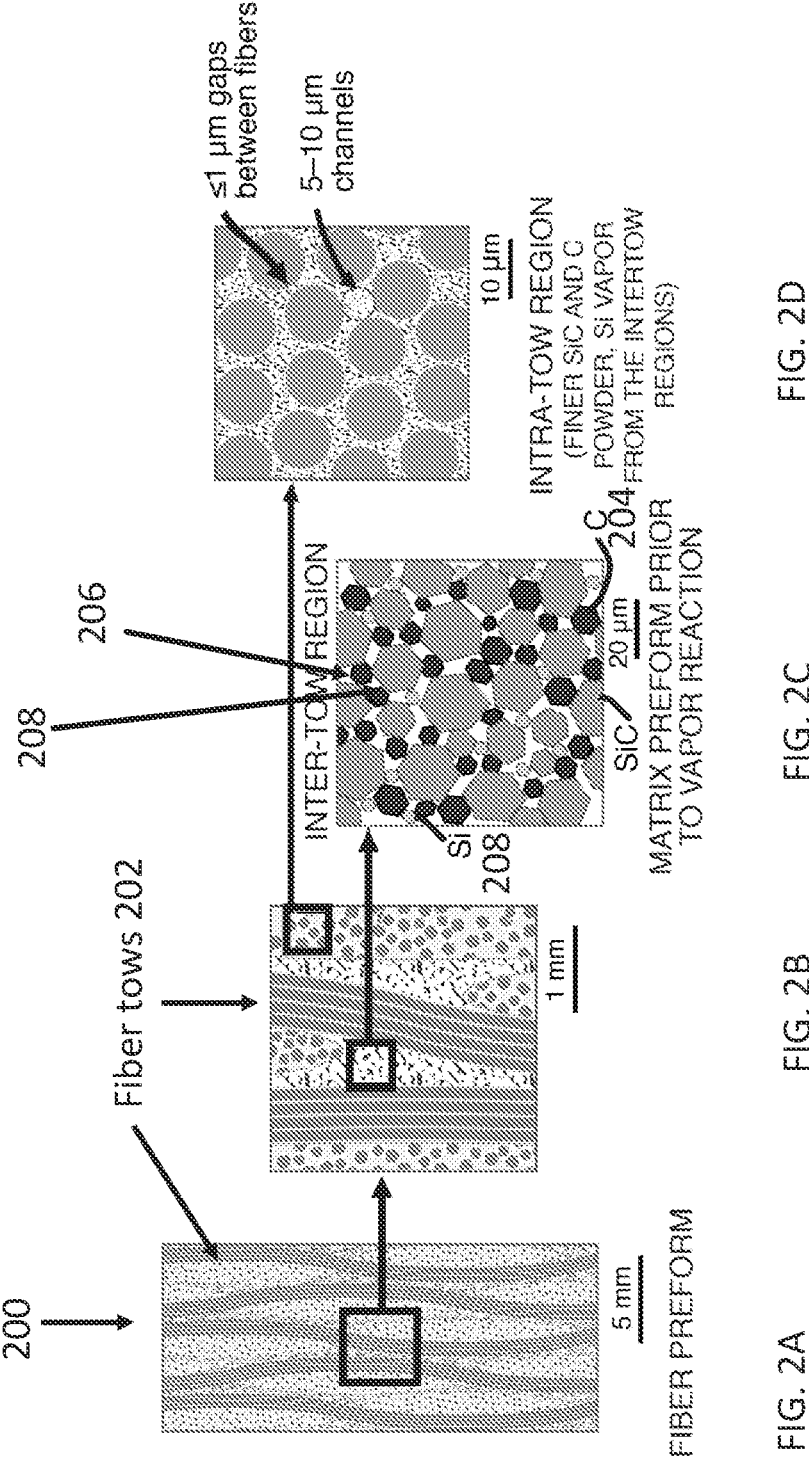
FIG. 2. Schematic representations of the various preform constituents and their length scales. From left to right: (A) a 2-dimensional fiber preform (with half of the fiber tows running approximately vertically and the other half normal to the page); (B) a slightly magnified version of the preform showing large matrix pockets between tows; (C) the constituent particles in the large matrix pockets; and (D) smaller matrix pockets between fibers within the tows.

FIG. 2 illustrates an example, comprising assembling a porous composite preform 200 including fiber tows 202 comprising SiC fibers, and a SiC particulate filler combined with the carbon particles 204, wherein the porous body comprises interconnected passages 206 for the permeation of Si vapor.

In one example, the porous preform further comprises silicon particles, and the method further comprises heating the porous body so as to vaporize the silicon particles and form a vapor.

In one or more examples carbon comprises amorphous carbon, graphitic carbon or turbostratic carbon derived from pyrolysis of carbon precursors such as, for example, resins or pitch (e.g., petroleum byproduct such as tar or asphalt).

Figures 3A, 3B:
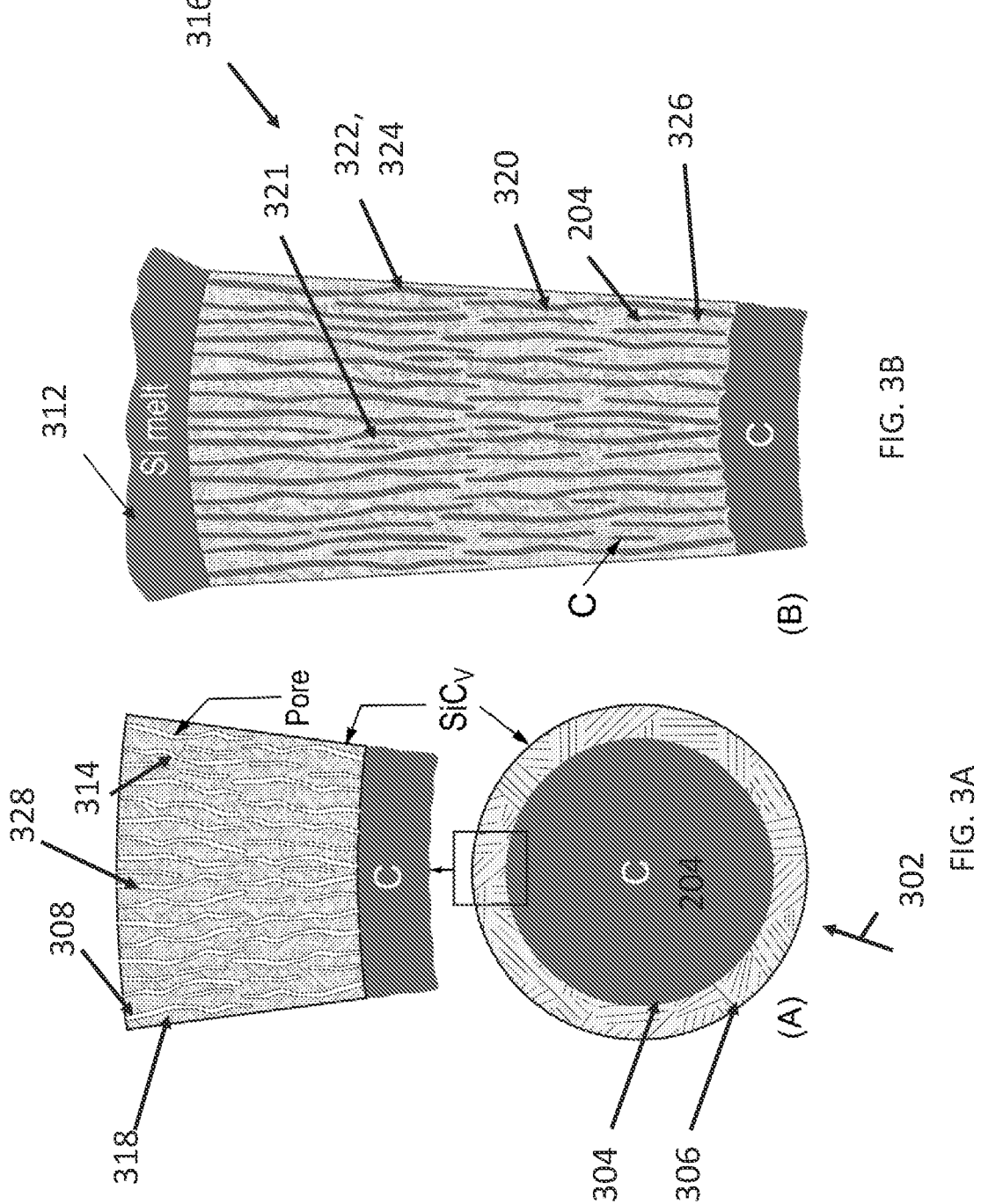
FIG. 3A-3C Schematic of the key steps involved in the SiC growth mechanism during vapor treatment and subsequent melt infiltration. (A) The microstructure formed during the vapor reaction, corresponding to the microstructures in FIG. 8, comprises a network of interpenetrating pores in the $SiC_V$ coated with a thin layer of Si condensed from the vapor. (B) Upon exposure to Si melt the latter readily penetrates the pores as it combines with the previously condensed Si, providing immediate access to the unreacted C. (C) Micrograph showing essentially complete conversion of material around an individual carbon particle to dense SiC.

Block 102 represents exposing internal surfaces 208 of a porous matrix pocket to the silicon vapor. FIG. 3A illustrates the silicon vapor 302 adsorbs on the surfaces 304 of the carbon particles and reacts with the carbon 304 so as to form a (e.g., nanoporous. e.g., thin) layer 306 of silicon carbide on the carbon particles. The (e.g., nanoporous, e.g., thin) layer 306 comprises a network of pores 308. A majority of the carbon in the porous preform 204 under the thin SiC layer 306 resulting from the vapor reaction remains available for a subsequent reaction with a Si-bearing melt 312.

In one or more examples, the vapor comprises pure silicon and the melt comprises a Si-based alloy wherein silicon is the major component of the alloy.

In one or more examples, the vapor is provided from an external source or by vaporizing discrete small silicon particles 208 incorporated in the preform. In one or more examples, the preform 200 is heated in a furnace to heat the preform 200 so as to vaporize the silicon particles 208, and the temperature is monitored using a temperature sensor in thermal contact with the preform 200.

In one or more examples, the network of pores comprising nanopores are formed within the (e.g., thin) SiC layers on the carbon by volume contraction resulting from the carbon reacting with the vapor; and the nanopores interpenetrate the silicon carbide layer initially formed from the vapor reaction and are connected to the interface with the carbon remaining available for the reaction with the reactive melt.

Figure 10:
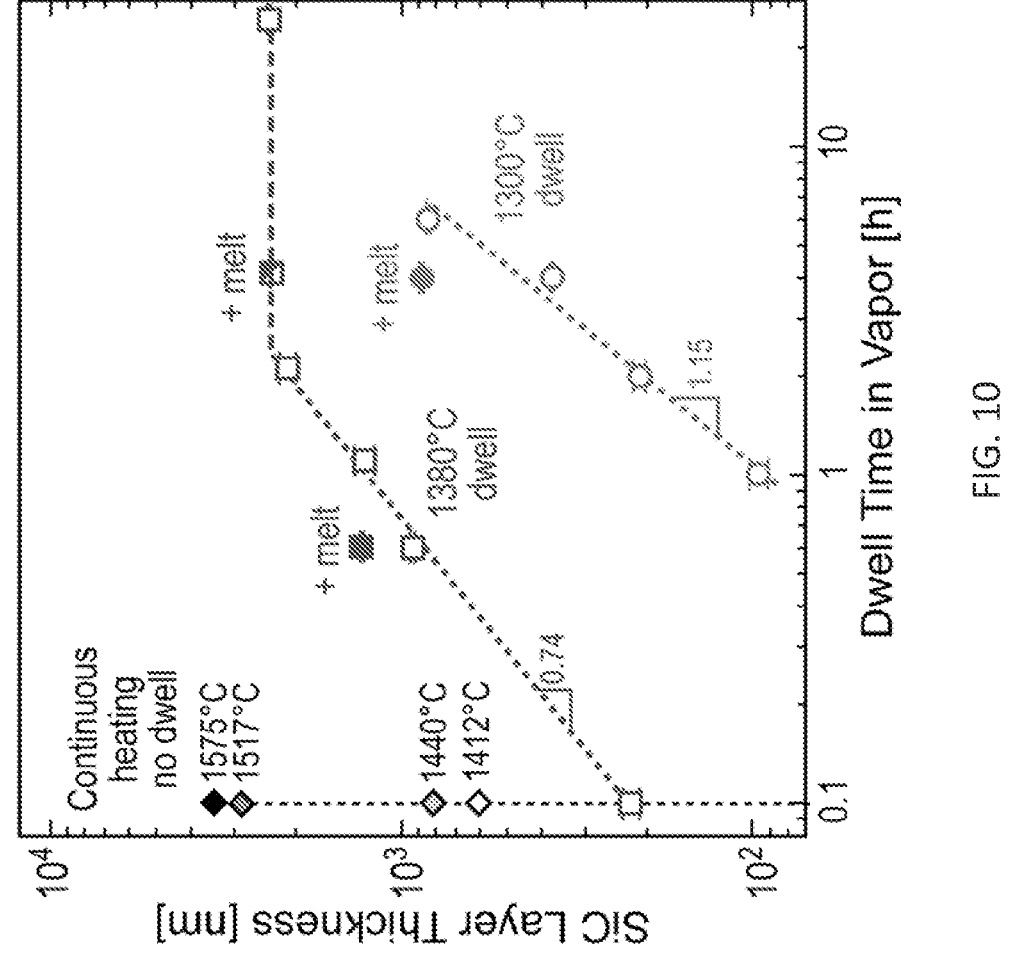
FIG. 10: The thickness of SiC layers formed during vapor exposures at 1300° C. and 1380° C. (Set 2) follows a power law with exposure time, up to a point where thickness reaches a plateau. For cases along the rising part of the kinetics, the additional excursion to the melting point yields a significant increase in thickness. Each data point is the average of 5 measurements and the error bars represent one standard deviation above and below the average. The thicknesses of layers formed during continuous heating/cooling without dwell (Set 1) are denoted by diamond symbols on the left.

In one or more examples, the step further comprises controlling a reaction rate of the vapor with the carbon surfaces so as to form the network of nanopores while preventing the silicon carbide synthesized from the vapor reaction from blocking the pores, (which is associated with a critical thickness corresponding to the plateau in FIG. 10 allowing passage of the reactive melt through the pores to access the majority of carbon that has not reacted with the silicon in the vapor.

In one or more examples, controlling the reaction rate comprises controlling a temperature of the vapor phase reaction so as to expose the outer surfaces to the vapor at one or more temperatures below a melting temperature of the silicon and for a duration, such that a thickness of the silicon carbide synthesized using the vapor does not block the pores. In one or more examples, the SiC should not become too thick that stresses causes closure of the pores (as shown by the thickness reaching a plateau as shown in the figure with the kinetic measurements, FIG. 10). In one or more examples, the temperature is 20-100K below the melting temperature of the silicon, wherein for the temperature of 20K the duration is 2 hours or less and for the temperature of 100 K the duration is 4 hours or less.

In one or more examples, the reaction is controlled to limit the thickness of the SiC formed from the vapor reaction, controlling the temperature and in some examples the environment (e.g., using small amounts of oxygen).

Figure 3C:
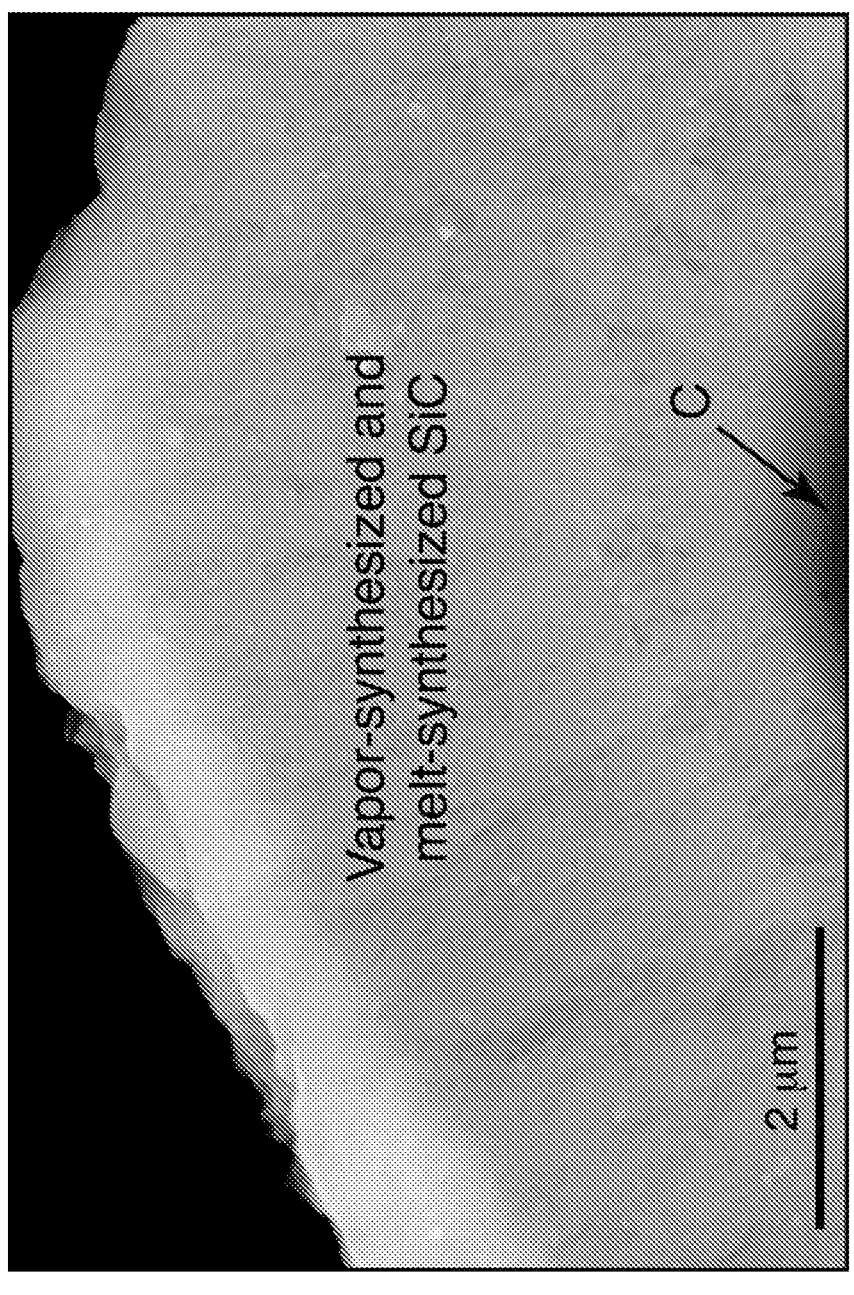
Figure 3D:
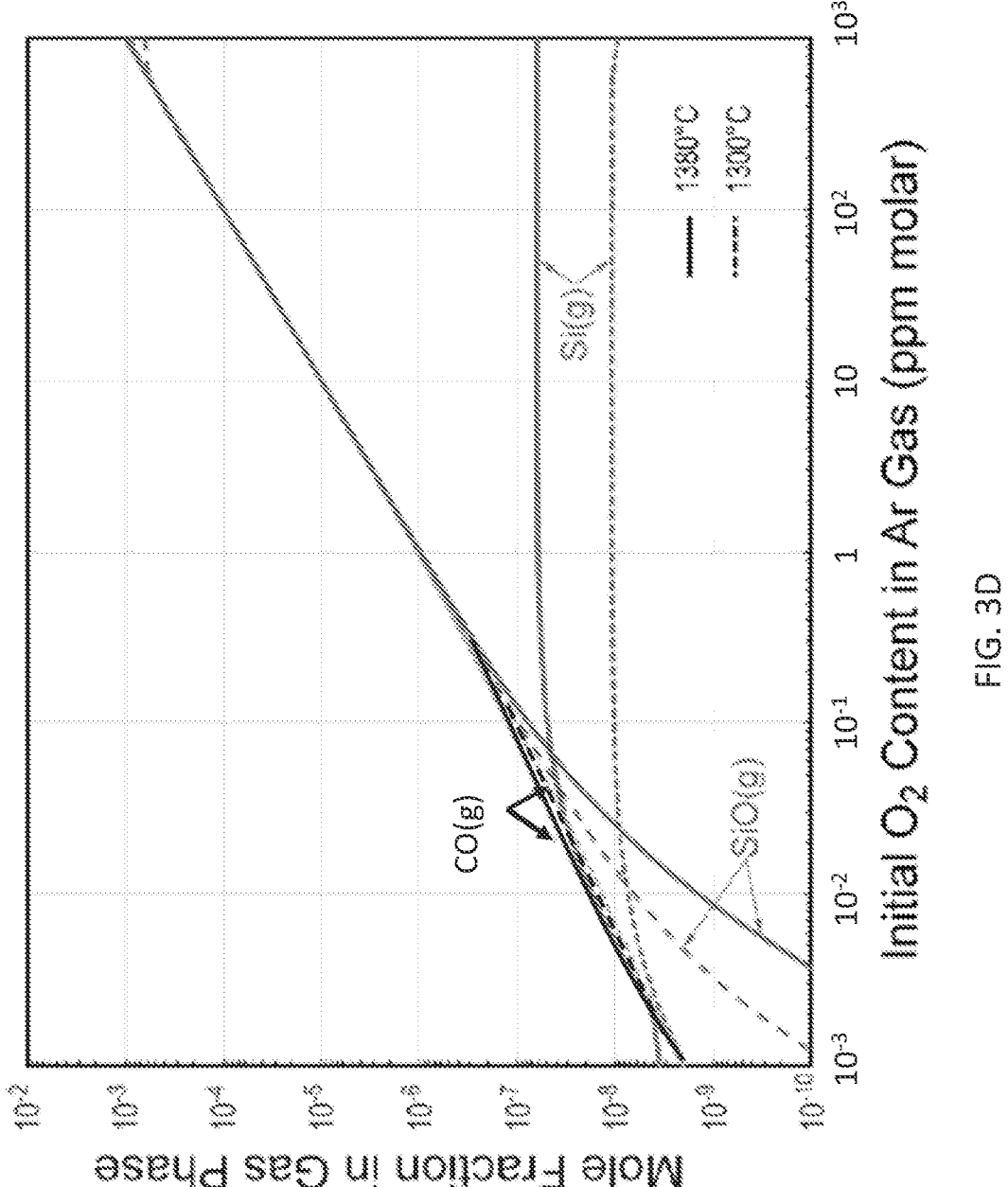
FIG. 3D. The calculated partial pressures of Si, SiO, and CO gaseous species after reaction of equimolar mixtures of Si+C in 1 mole of Ar containing a small amount of $O_2$ as impurity, shown in the abscissa, at 1 atm total gas pressure and the two temperatures investigated. The solid lines correspond to 1380° C. while the dashed lines are for 1300° C. The small drop in the SiO(g) and Si(g) for 1300° C. near the highest $O_2$ contents reflects the onset of oxidation of SiC. For $O_2$ contents<$10^{-2}$ ppm, there is an inflexion point in the Si(g) curve for 1380° C. as it approaches asymptotically the values corresponding to the calculation for no $O_2$. A similar inflexion exists at 1300° C. below $10^{-3}$ ppm.

FIG. 3D illustrates how the oxygen content can be controlled (typically at very low levels, e.g., less than 100 ppm) in the environment to promote the formation of SiO (monoxide) gas by reaction with the solid Si, which can contribute to the availability of Si reactant in the vapor phase that reaches the C surfaces. This enables a reduction in the temperature during the vapor conditioning stage by taking into account reaction of the carbon with the silicon in the silicon monoxide. This reduced temperature can help minimize damage to components of the preform.

In one or more examples, the nanoporous layer comprises elongated grains of silicon carbide bounding the network of nanopores. In one or more examples, the elongated grains have average widths in the range of 100 nm-200 nm and an aspect ratio approximately in a range of 8-12. In one or more examples, the elongated grains comprise arrays of randomly spaced stacking faults separated by spacings of 10 nanometers or less.

Block 104 exposing the carbon preform surfaces modified with the nanoporous SiC layer 306 to the reactive melt 312 comprising molten silicon or a silicon alloy, wherein the reactive melt infiltrates first the network of larger pores (passages 206 in the preform 200) in the nanoporous SiC layer 306 so as to wet or contact the silicon carbide on the inner surfaces 314 of the pores 308 and then through the pores 308 in the network of nanopores in the (e.g. thin) SiC layer 306 to react with the majority of the carbon 204 so as to form additional silicon carbide at the interfaces with the remaining carbon 204 and eventually filling the entire network of pores 308. In one or more examples, additives are included in the melt (e.g., Yttrium [10, 20]) so as to reduce the melting temperature and to form refractory (high melting point) silicides during reaction of the melt with the unreacted silicon 310.

Figure 7:
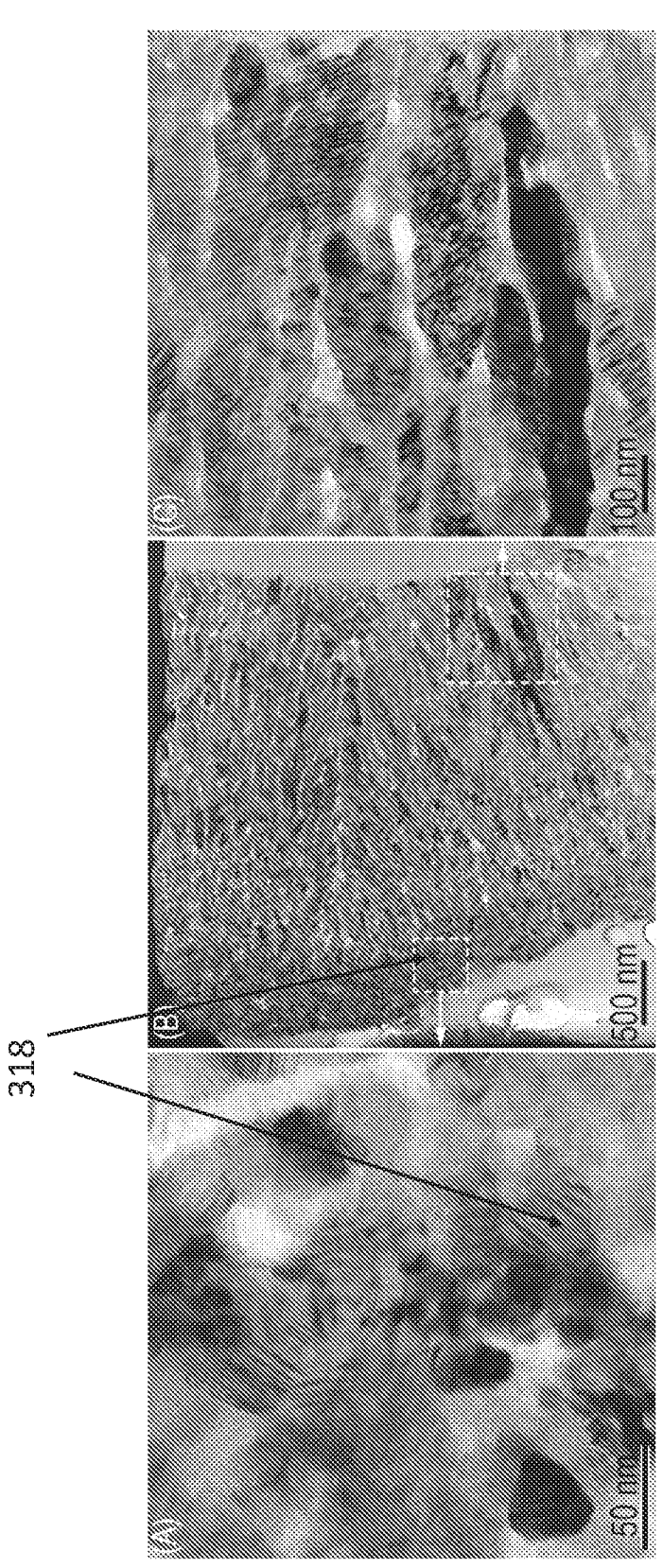
FIG. 7: Two distinct regions of SiC are observed after continuous heating to 1575° C.: (A) a surface layer comprised of fine, equiaxed grains and (C) a much thicker layer containing high aspect-ratio grains with interpenetrating pores and residual carbon at some grain boundaries. The entire SiC shell and adjoining Si (left) and remnant C core (right) are shown in (B).
Figure 8:
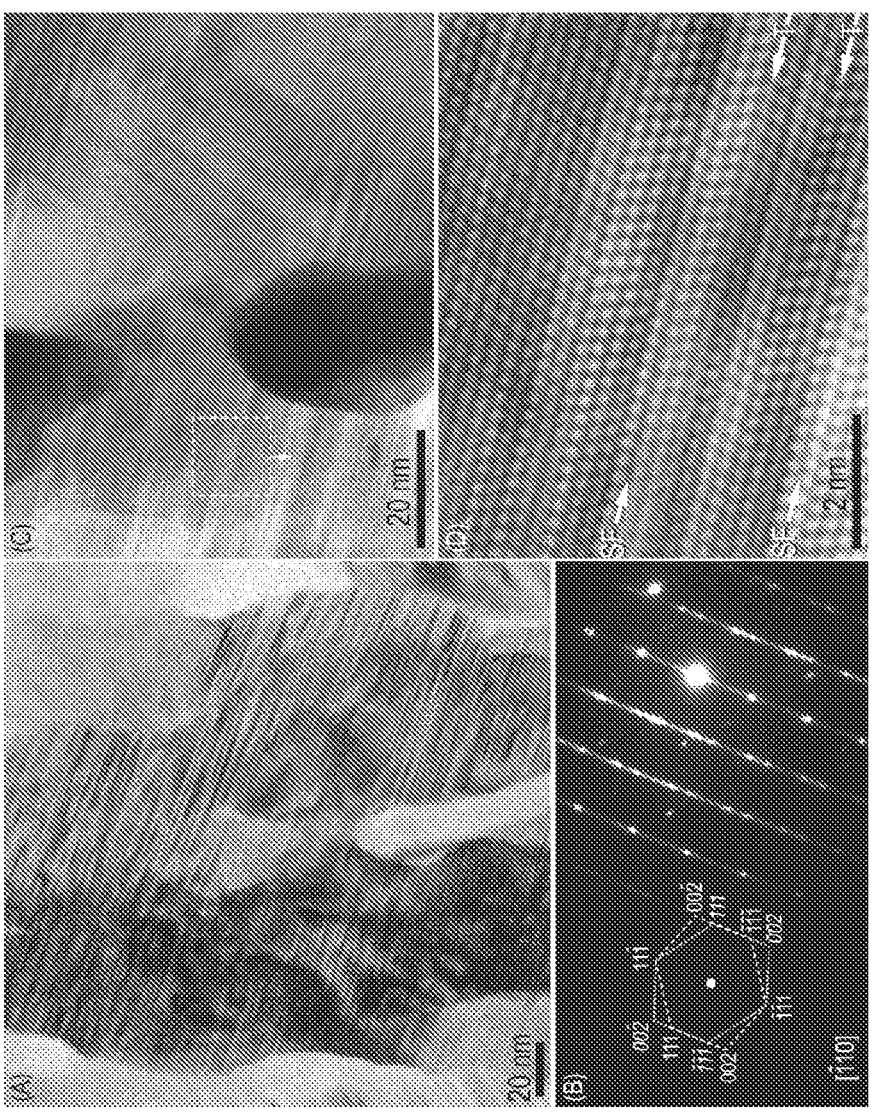
FIG. 8: Details of the heavily crystallographically faulted structure characteristic of the elongated β-SiC grains produced by reaction upon heating above 1412° C. (1575 degrees C.), but also found in grains produced by reaction with the vapor. (A) is a crystal taken from the region in FIG. 7(C), with faults predominantly along (111) planes. The diffraction pattern in (B) shows a twinning relationship between faulted regions, with streaking consistent with closely but irregularly spaced faults as shown in (C). High resolution image in (D) from the region marked by the box in (C) shows examples of twin domains meeting at planes denoted by arrows on the right edge, and stacking faults marked by arrows on the left edge. This figure is taken from the same region as (7C), which is after running the specimen all the way to 1575C, i.e. vapor+exposure to the melt.
Figure 9:
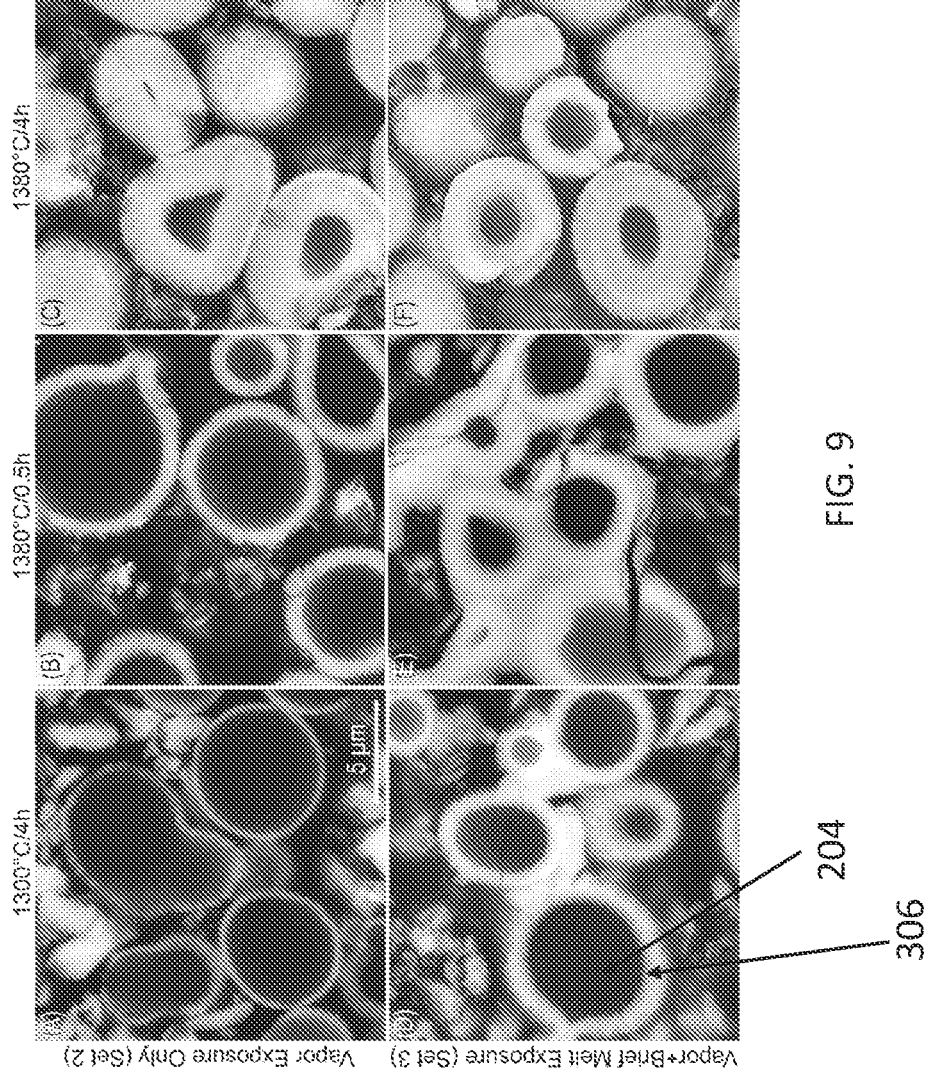
FIG. 9: SiC shells form on C particles reacted with (A-C) vapor alone and (D-F) brief exposure to melt by heating to 1412° C. after the corresponding vapor stage and cooling immediately. For thinner shells formed from the vapor (A,B) the melt exposure leads to a pronounced increase in the SiC shell thickness, as in (D,E). For extensive reaction with the vapor the subsequent melting has little effect, cf. (C) and (F). Scale is the same for all images.

In one or more examples, the vapor uniformly infiltrates an entirety (at least 99%) of the passages in the porous carbon bearing preform through interconnections between the passages, and the melt uniformly infiltrates an entirety (at least 99% of the pores in the porous layer created by the reaction with the vapor through interconnections between the network of pores. In one or more examples, after the Si:C ratios from ~1.5 to ~2.3, but by the time the reaction is complete the Si:C ratio is essentially 1, see FIG. 7.

Block 106 represents the end result, a silicon carbide matrix, e.g., as illustrated in FIG. 3C.

FIG. 3A and FIG. 3B illustrate an example intermediate state of the silicon carbide matrix 316 after melt infiltration an intermediate (not terminal) state, where the molten Si is passing through the narrow paths and continuing to react with the carbon particle 204. FIG. 3B illustrates the intermediate state of the silicon carbide matrix comprises silicon carbide comprising vapor synthesized silicon carbide comprising grains or crystals 318 of silicon carbide formed by a reaction of the carbon 204, C with the vapor 302 comprising silicon and leaving unreacted carbon 204. The matrix 316 further comprises reactive melt synthesized silicon carbide 320 formed at the interface 321 between any previous SiC layer (e.g., including vapor synthesized grain 318) and the unreacted residual carbon 204 remaining after the reaction with the vapor 302. The reactive melt synthesized silicon carbide is formed by infiltration of molten silicon 322 to the unreacted carbon 204 and reaction of molten silicon with the unreacted carbon. In one or more examples, the different regions of unreacted carbon comprise different ones of the carbon particles 204 in the preform 200 after different amount of consumption or reaction with the silicon.

In one or more examples, most or all of the Si in the channels would be eventually consumed by the reaction, the diffusion distances should be short enough that the reaction will be largely completed in a reasonable time, as illustrated in FIG. 3C.

In various examples, the resulting matrix comprises one or more regions where the reaction of reactive melt with carbon is incomplete, so that the silicon carbide comprises a minor fraction (desirably less than 10%) of channels 324 or pockets consisting essentially of silicon. As illustrated in FIG. 3B, the channels or pockets are separated by or interspersed with the silicon carbide comprising elongated silicon carbide grains 326. As described herein, the channels comprise reactive melt infiltration paths from the boundary 328 between the original pore space 308 and the outer surfaces of the vapor synthesized silicon carbide 318 to locations of the unreacted carbon 204 inside the silicon carbide. More specifically, the paths are formed by the infiltration of the reactive melt into the network of nanopores 308 in the vapor synthesized silicon carbide, the network of nanopores 308 formed during the reaction with the vapor and connected to the unreacted carbon after the reaction with the vapor. As illustrated in FIG. 313, the nanopores 308 are between grains 318 of the vapor synthesized silicon carbide and further propagated during the melt reaction with the residual carbon.

In one or more examples, the nanopores have diameters or widths in a range of 1-100 nm and the elongated silicon carbide grains are formed on grains of the vapor synthesized silicon carbide by the reaction of the molten silicon with the unreacted carbon remaining after the reaction with the vapor. In various examples, the channels are non-percolating or non-interconnected channels and any pockets are isolated by the surrounding SiC. Example dimension wherein the channels each have a width of 1-100 nm.

In one or more examples, the silicon carbide (including vapor synthesized silicon carbide and reactive melt synthesized silicon carbon) comprise the elongated grains of faulted crystalline silicon carbide. In various examples, the silicon carbide produced by the sequence of vapor and melt reactions comprises largely stoichiometric SiC crystals incorporating less than 5% residual carbon (i.e., unreacted carbon) and less than 5% residual silicon (i.e., unreacted silicon) as impurity phases, or any excess silicon combined into refractory silicides.

In one or more examples, the melt flow comes in first through the larger pores/passages in the preform, but then through the nanopores in the vapor-synthesized SiC layer. In one or more examples, the reaction with the melt is controlled until the macroscopic infiltration through the larger pores into the entire preform (fibers and matrix) is completed to avoid choking. In one or more examples, once large scale infiltration is completed, the vapor synthesized layer breaks down and allows direct contact of the bulk melt with the residual carbon.

In another example, a SiC based ceramic matrix composite (CMC) is formed using the silicon carbide matrix, wherein the composite comprises (e.g., suitably coated) ceramic fibers combined with or embedded in the matrix. Fibers (e.g. fiber tows 202) would typically be coated to enable interfacial debonding and pullout during fracture. In one or more examples, the coatings are typically boron nitride which need to be protected from contact with the Si melt and so they may be covered using chemical vapor infiltration.

Example applications include, but are not limited to, a combustor liner or turbine component comprising the composite of any of the examples, the turbine comprising any or all of the following components: a turbine shroud, turbine vane, or turbine blade. In one or more examples, a power generation plant or aircraft engine can include the combustor liner or turbine components manufactured using the ceramic composite matrix manufactured according to the examples disclosed herein.

The following sections describe example experimental implementations of the methods described above. Various corresponding features of the matrix labeled in FIGS. 2-3 are labeled with the same reference numbers in FIG. 4-11.

2. Example Experimental Methods 2.3. Materials

Figure 4:
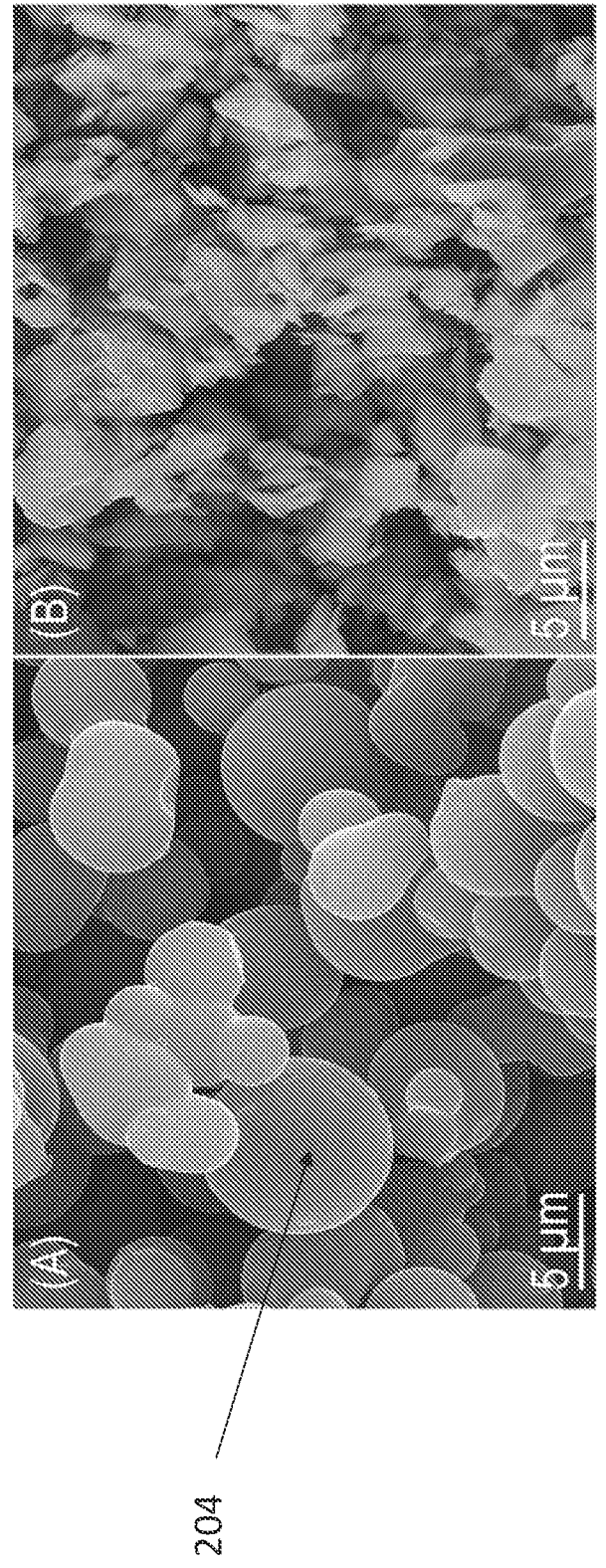
FIG. 4: Feedstock used in initial development and proof of concept: (A) amorphous C particles and (B) irregularly shaped Si particles

The studies used amorphous C spherical powder, 2-12 μm in diameter (Sigma-Aldrich, Saint Louis, MO), and angular Si powder, 1-5 μm in size (AlfaAesar, Tewksbury, MA), illustrated in FIG. 4. Spherical C powder was selected in order to facilitate measurement of surface reaction layers; such measurements are hindered when using irregularly-shaped graphitic carbon. By virtue of its shape, the angular Si powder is readily identifiable in the mixtures (before melting). It is noted, however, that the principles established should also be applicable to other combinations of carbon particles and Si vapor sources.

2.4. Quantification of the Reaction Kinetics

Figure 5:
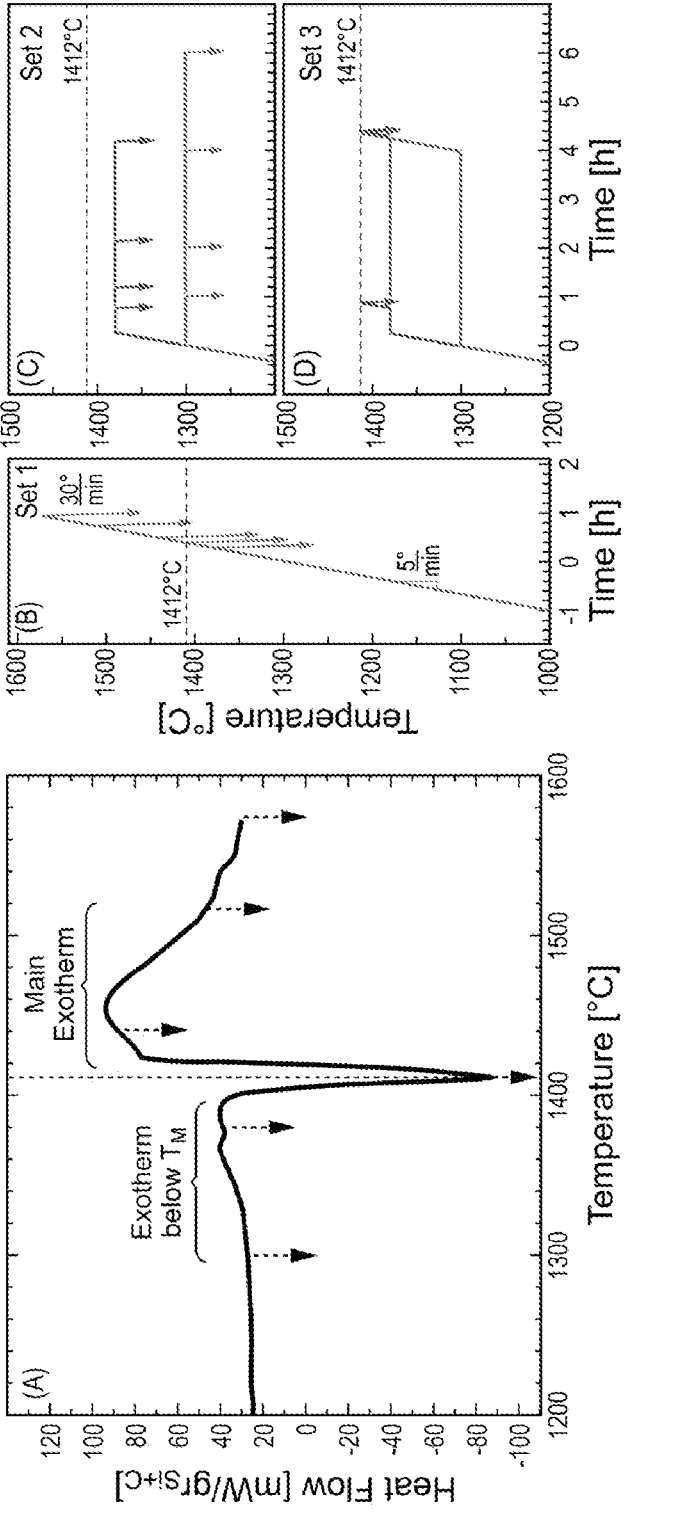
FIG. 5: Schematic of the differential thermal analysis (DTA) experiments used to elucidate the phenomena underpinning this invention. (A) Heat evolution scan typical of the reaction of amorphous C with Si. Note that the heat evolution starts below the melting point of Si, a phenomenon ascribed to the reaction between Si vapor and solid C. Three types of interrupted DTA experiments were performed: (B) continuous heating/cooling up to temperatures below and above the melting point of Si (Set 1), (C) heating, dwell and cooling to temperatures below the melting point of Si (Set 2) and (D) heating, dwell at temperatures below the melting point of Si, followed by heating to the onset of melting, and cooling immediately (Set 3). The origin of time is set when the thermal history crosses the estimated onset of the vapor reaction, i.e. 1300° C.
Figure 6:
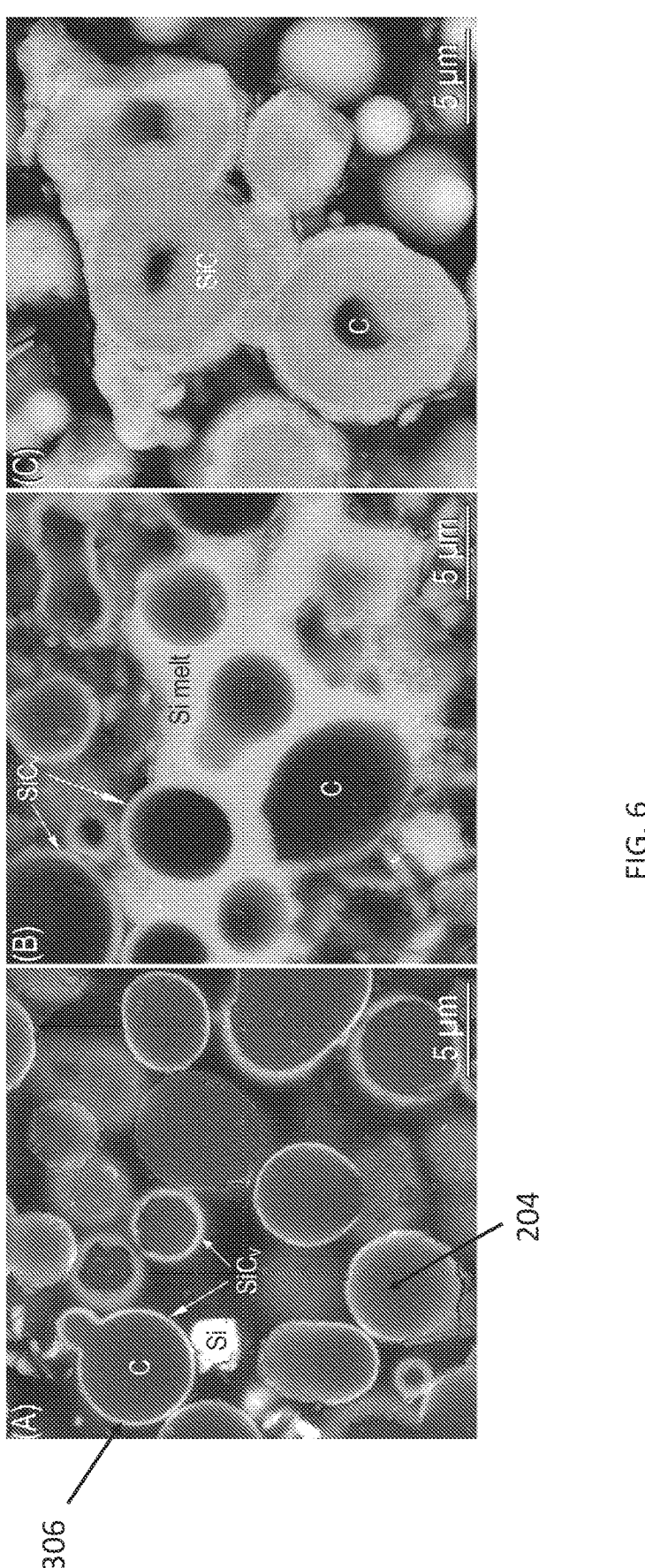
FIG. 6: Progressively increasing amounts of SiC are formed with increasing peak temperature during continuous heating/rapid cooling experiments with no dwell (Set 1). Scanning electron microscope images show cross-sections of mixtures heated to peak temperatures of (A) 1380° C., (B) 1412° C., and (C) 1575° C. The labels represent unreacted carbon (C), SiC formed from the vapor before melting ($SiC_V$), unmelted Si, spreading Si melt over the pre-reacted SiC surface layers on C, and the SiC formed by reaction of the melt with remaining carbon.

The evolution of the SiC reaction was studied using differential thermal analysis (DTA, Setsys 16/18 DTA, Setaram, Hillsborough, NJ). An equiatomic mixture of C and Si powders was laced in a glass vial and mixed overnight in a roller mixer. For each experiment, some of the mixed powder was packed into an 80 μL alumina crucible (Setaram, Cranbury, NJ) and then subjected to a prescribed heating cycle in UHP Ar (1 ppm $O_2$) at 1 atm. The typical DTA scan and interrupted experiments are shown in FIG. 5.

In the first set of interrupted experiments, FIG. 5(B), mixtures were heated continuously at 30° C./min to 800° C., then at 5° C./min to a specified peak temperature, and immediately cooled at 30° C./min to ambient with no intermediate dwell. The first run in this set was performed to 1575° C., the temperature at which the thermal excursion associated with the main SiC reaction had essentially declined to the baseline, as shown in FIG. 5(A). This experiment was used to identify pertinent thermal events such as melting endotherms and reaction exotherms, which were then used to select peak temperatures for subsequent experiments. The subsequent experiments were performed to one of four peak temperatures, selected to be either below (1380° C.) or above the melting point of Si (1412° C., 1440° C., 1517° C.). In Set 2, mixtures were subjected to the same heating sequence as that in Set 1 but were held at peak temperatures below the melting point for times ranging from 30 min to 24 h before cooling to ambient. In Set 3, mixtures were initially subjected to the same heating sequence as that of Set 2. Then, after the dwell period, they were heated at 5°

C./min to just above the onset of Si melting (1412° C.) and immediately cooled upon reaching that temperature.

3. Experimental Evidence 3.3. Differential Thermal Analysis

The prototypical DTA experiment under continuous heating, shown in FIG. 5(A), reveals a significant exotherm prior to melting, starting at ~1300° C. and ending at the onset of the melting endotherm (~1400° C.). This exotherm is ascribed to reaction of C with Si vapor. Later, the melting endotherm is arrested by a large exotherm associated with the reaction between liquid Si and C that peaks at −1450° C. and declines to the baseline at ~1575° C. The large exotherm is consistent with a more extensive reaction with the liquid than that below the melting point.

3.4. Microstructure Evolution During Continuous Heating.

The synthesis reaction during continuous heating occurs in three stages, with the stages delineated by the peak temperature relative to the melting point of Si.

(i) Below the melting point of Si, thin layers of SiC are formed on the C particle surfaces. For example, layers of SiC about 200 nm thick are clearly identifiable in the specimen heated to 1380° C. and cooled immediately (FIG. 6A).

(ii) Upon incipient melting (1412° C.) pockets of liquid are found spreading over the surface SiC layer (FIG. 6B), despite the fact that the Si was molten for only a very short time. Evidently the degree of pre-conditioning of the particles during the heating period preceding melting is sufficient to facilitate effective wetting by the melt. (Here the liquid does not fill all the interparticle spaces because the original mixture was stoichiometric and had a packing density of only 60-70%. Thus, when the Si particles melted, the melt volume was insufficient to "pull" the SiC coated C particles together by capillarity. Instead, the melt pooled in discrete areas, often close to the bottom of the compact). This offers a path to control the extent of vapor exposure by using a sub stoichiometric amount of Si powder thereby conditioning the surfaces but leaving the pore structure essentially open for subsequent infiltration by an alloy melt.

(iii) For temperatures above the melting point, the reaction proceeds rapidly. For example, at a peak temperature of 1575° C. (past the major reaction exotherm), the C particles appear largely converted to SiC (FIG. 6C). The extent of conversion varies spatially because of the non-uniform distribution of the melt, as noted earlier. Interestingly, even in places where no residual melt is present on the particle surface, the SiC shell continues to thicken owing to the higher vapor pressure generated by the melt present elsewhere.

Closer inspection of the reacted particles heated past the Si melting point shows that most exhibit a two-layer structure: a thin surface layer of equiaxed grains, presumably associated with the earlier reaction with the vapor, and a thick region of radially oriented grains. These features are evident in the SEM images in FIG. 6(C) and the TEM images in FIG. 7 for a specimen heated to 1575° C. In this case the surface layer in (B) is about 450 nm thick and is comprised of fine equiaxed grains 35-95 nm in size, e.g. FIG. 7(A). The bulk of the SiC, ~2.7 μm thick, consists of high aspect-ratio grains (~10:1) growing approximately radially toward the particle center. Both types of grains contain high densities of crystalline planar faults. EDS measurements of the region in FIG. 7(C) reveals a Si:C ratio of ~1, with occasional pockets of residual C, represented by the nearly white areas in this figure. If the Si:C ratio is close to 1 and there is very little C left, if any, there is a similar amount of Si (in moles or gr-atoms) present.

3.5. Reaction Kinetics and Microstructure Evolution During Vapor Exposure

The observations above evidence that exposure of the C surfaces to Si vapor can produce SiC with attendant benefits in wettability by molten Si. The need for understanding the underlying mechanisms and kinetics of the solid-vapor reaction as well as its implications for the subsequent interaction with the liquid is thus self-evident. Toward that end, additional DTA experiments (Set 2) were performed with varying dwell times at either 1300° C. or 1380° C.—the temperatures bounding the pre-melting exotherm in FIG. 5(A). Representative images of the SiC shells formed after one of three selected temperature-time exposures are presented in FIG. 9(A-C) while the corresponding measurements of SiC layer thickness are plotted on FIG. 10.

Within a certain domain, the SiC layer thickness follows a power law with exposure time with an exponent near unity. The trend ceases at a critical thickness (about 2 μm at 1380° C.) beyond which the thickness remains essentially constant even after 24 h exposure.

Figure 11:
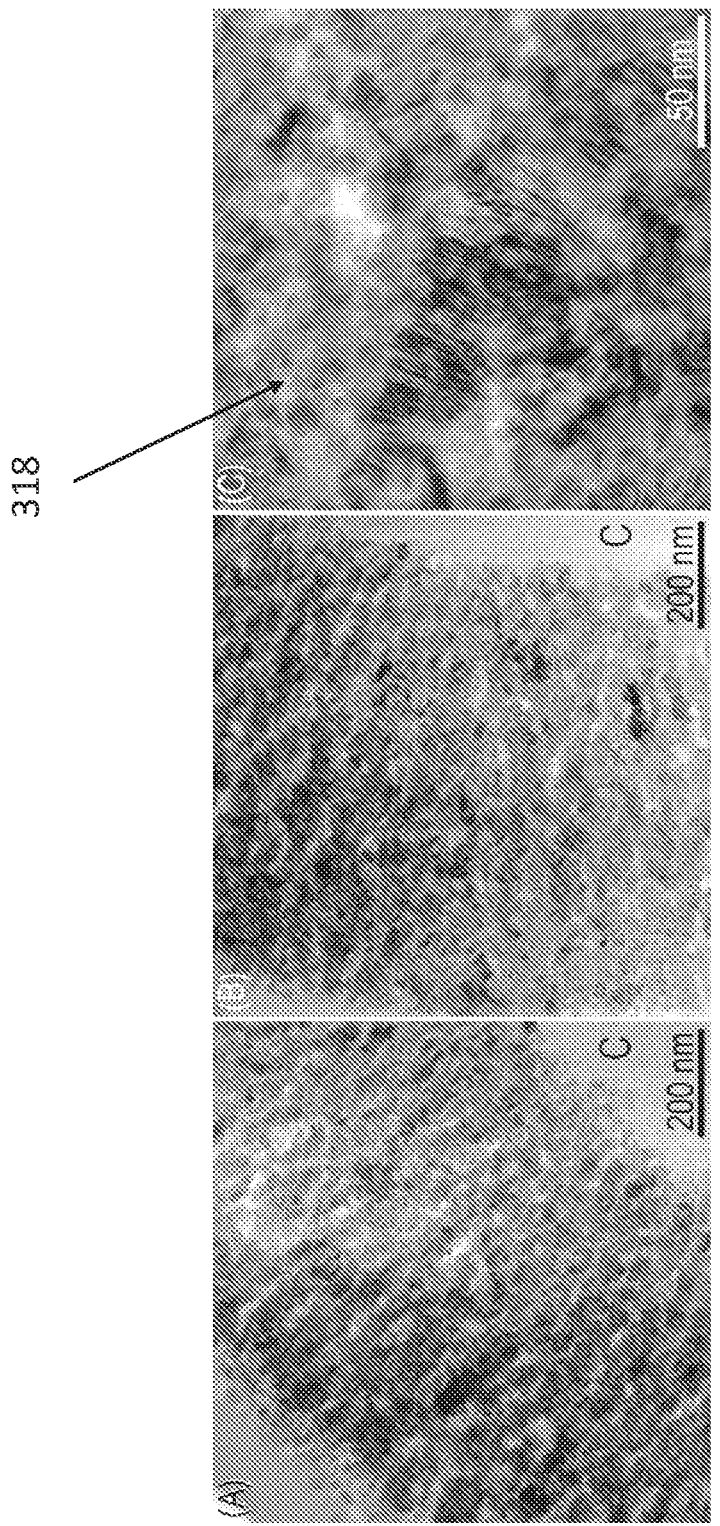
FIG. 11: TEM images of the SiC shells formed by reaction of C particles with Si vapor (A) after 6 h at 1300° C. and (B) after 30 min at 1380° C. Both contain nano-scale equiaxed grains in the outer region (left side of micrographs) and fine columnar grains in the inner regions. The higher magnification TEM image in (C) shows that the elongated grains are heavily faulted, similar to those in FIGS. 7 and 8.

While the microstructures produced during vapor exposure exhibit features similar to those obtained after continuous heating above the melting point, the compositions exhibit some important differences. The microstructures obtained at 1300° C. and 1380° C. for exposure times that yield comparable SiC layer thicknesses (~84010 nm after 6 h and ~93≈15 mu after 0.5 h, respectively) are shown in FIG. 11. EDS analyses at locations about ⅓ of the way through the shell thickness from the outer surface reveal that the Si:C ratio within the SiC layer is ~1.8 after 1300° C./6 h~2.3 after 1380° C./0.5 h). These values reflect the presence of significant amounts of free Si within the pores of the SiC layer. This differs from the compositions measured for the columnar grain regions after melt reaction where the average Si:C ratio is close to 1, c.f. FIG. 7C, indicating there is very little free C and free Si left.

3.6. Microstructure Evolution Upon Melt Exposure

Brief exposure to the melt after low-temperature vapor exposure usually yields significant increases in the amount of SiC formed. A useful baseline is the SiC thickness produced under continuous heating to 1412° C. and immediate cooling: about 600 nm. In comparison, while a vapor exposure of 4 h at 1300° C. produces a 400 nm-thick SiC layer, the same vapor exposure followed by a brief melt exposure yields a total thickness of 900 nm. The increase associated with melt exposure (500 nm) is comparable to that produced solely under continuous heating to the melting point (600 nm). In another case, a vapor exposure of 30 min at 1380° C. yields a SiC thickness of about 900 nm; with additional melt exposure, the total thickness is about 1300 nm. Here the increase due to melt exposure is about 400 nm: comparable to, though somewhat lower than, the thickness produced during continuous heating.

In another domain, where the thickness of SiC produced during vapor exposure has reached a plateau (FIG. 10), a brief melt exposure has negligible effect. For example, the thickness produced after a vapor exposure of 4 h at 1380° C. (2.4 μm) is virtually indistinguishable from that produced by the same vapor exposure followed by melt exposure, cf FIGS. 9(C) and (F), or by a 24 h exposure to the vapor alone. An EDS scan through the SiC shell reveals a SiC ratio of ~1.5 near the surface declining to ~1 beyond the midpoint (>1.2 μm). This suggests a gradual reduction in the pore cross section available for flow and the concomitant reduction in permeability as the shell thickens. Note that thicker shells are achieved under continuous heating mostly through the melt range, e.g. ~3.3 μm in the ~0.9 h it takes to heat up from 1300° C. to 1575° C., compared with 2.4 μm upon exposure to vapor alone for 4 h at 1380° C.

Figure 12:
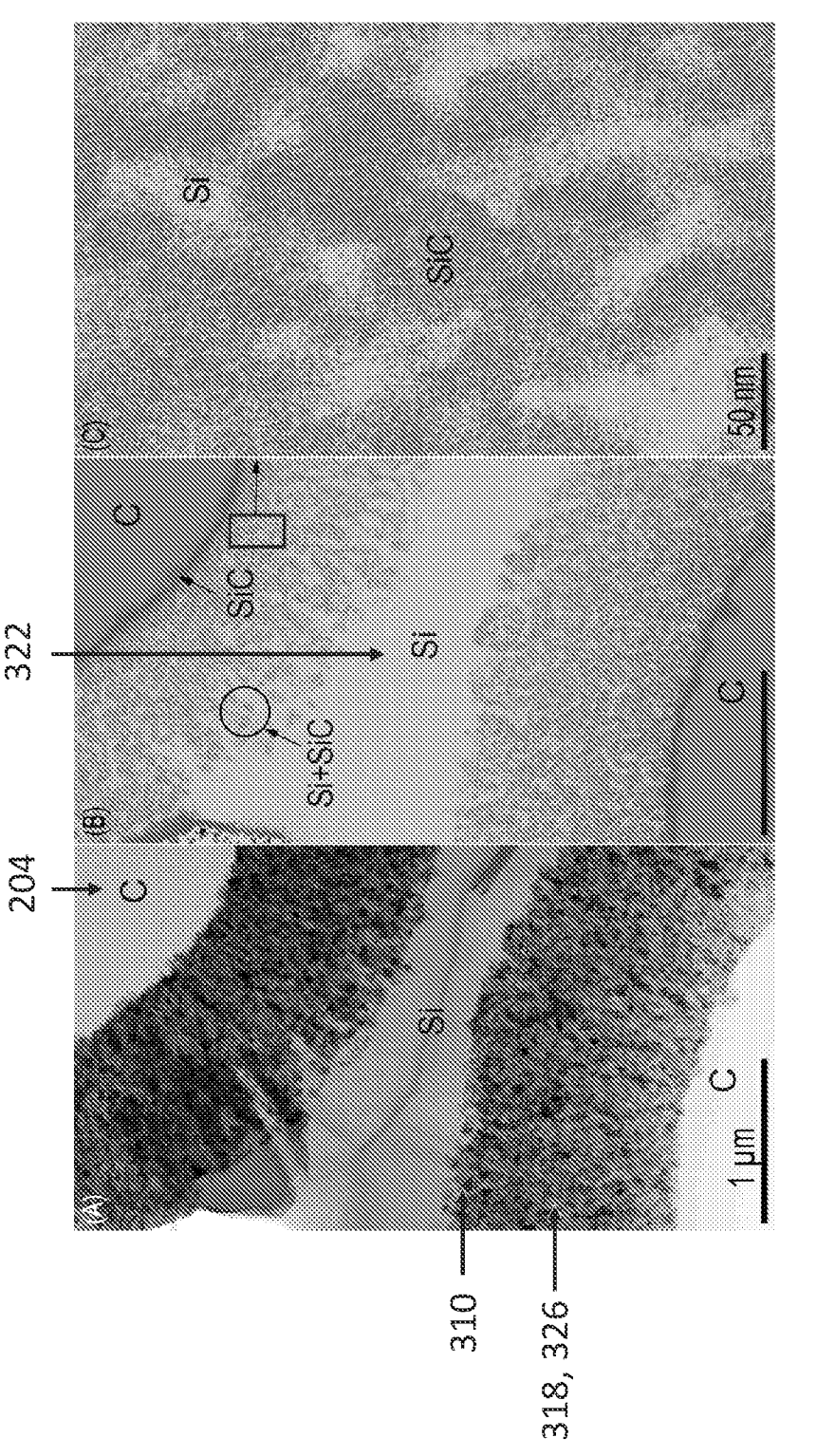
FIG. 12: Brief melt exposure following vapor exposure for 30 min at 1380° C. leads to some dispersion of the SiC grains formed during vapor exposure and interspersion of Si into the resulting inter-grain regions. The effects are revealed both in the TEM image in (A) and the corresponding elemental maps in (B) and (C). In the elemental maps, carbon is magenta, silicon is light blue, and SiC is dark blue (the latter from an overlay of carbon and silicon). The elemental map in (C) shows the presence of channels within the SiC layer that enable transport of the melt to the reaction front.

The early stages of the interaction of a Si melt with the SiC surface layers produced by the reaction of Si vapor with two neighboring C particles are illustrated in FIG. 12. This sample corresponds to a vapor exposure of 30 min at 1380° C. followed by a brief melt exposure. (The same general features are obtained after vapor exposure of 4 h at 1300° C. followed by melt exposure or after continuous heating to the onset of melting without dwell.) As noted earlier, at the end of the vapor reaction, the microstructure comprises nanocrystalline SiC interpenetrated with Si, presumably condensed from the vapor phase, to yield a Si:C ratio of ~2.3. Upon additional heating to ~1412° C., the Si already incorporated in the particle likely melts and, as it becomes intermixed with the wetting melt, produces a local swelling of the outer layer with some dispersion of the outer grains, illustrated in FIG. 12(A,B). Indeed, it was not uncommon to find small sections of SiC produced from the vapor detaching and dispersing into the bulk melt, with no remaining connection to C. This swelling opens additional paths for further infiltration of the melt and hence for further growth of SiC toward the particle center, but it should not lead to macroscopic detachment that would allow full access of the melt and faster reaction, possibly leading to choking before infiltration of the entire preform is completed. A network of interpenetrating Si channels within the SiC layer is clearly revealed by the elemental map in FIG. 12(D). Concomitantly, the EDS trace in FIG. 12(C) reveals a Si:C ratio within the outer SiC layer ranging from ~4 to ~9, much higher than that measured at the end of the vapor exposure.

4. Interpretation of Findings

The findings described above provide insight into (i) the mechanism by which Si vapor interacts with the surface of amorphous C particles, (ii) the manner in which the modified surfaces interact with the Si melt, (iii) the roles of temperature and time in these interactions, and (iv) the potential implications for the synthesis of CMC matrices. These are discussed in the following sections.

4.3. Mechanism of Si Vapor Reaction with C

The presence of remnant Si within channels in the SiC formed during vapor exposure indicates that the mechanism of SiC formation involves pore networks that serve as pathways for ingress of Si vapor; the vapor then deposits on internal C surfaces as solid Si before reacting with C to form SiC. Subsequent nanoscale pore formation is likely a consequence of the molar volume change accompanying the reaction.

Without being bound to a particular scientific theory, the volume contraction drives the formation of pores at the surface as C is progressively replaced by SiC. These pores enable continued access of Si vapor to the unreacted C, with ensuing reaction and additional volume contraction that extend the pores radially inward and lead to the formation of elongated grains (FIG. 11). While the phases are too fine to be clearly resolved in the TEM images, the high Si:C ratios measured within the SiC (~2) after vapor exposure support the current hypothesis.

4.4. Melt Interaction with Pre-Conditioned Carbon Surfaces.

Figure 13:
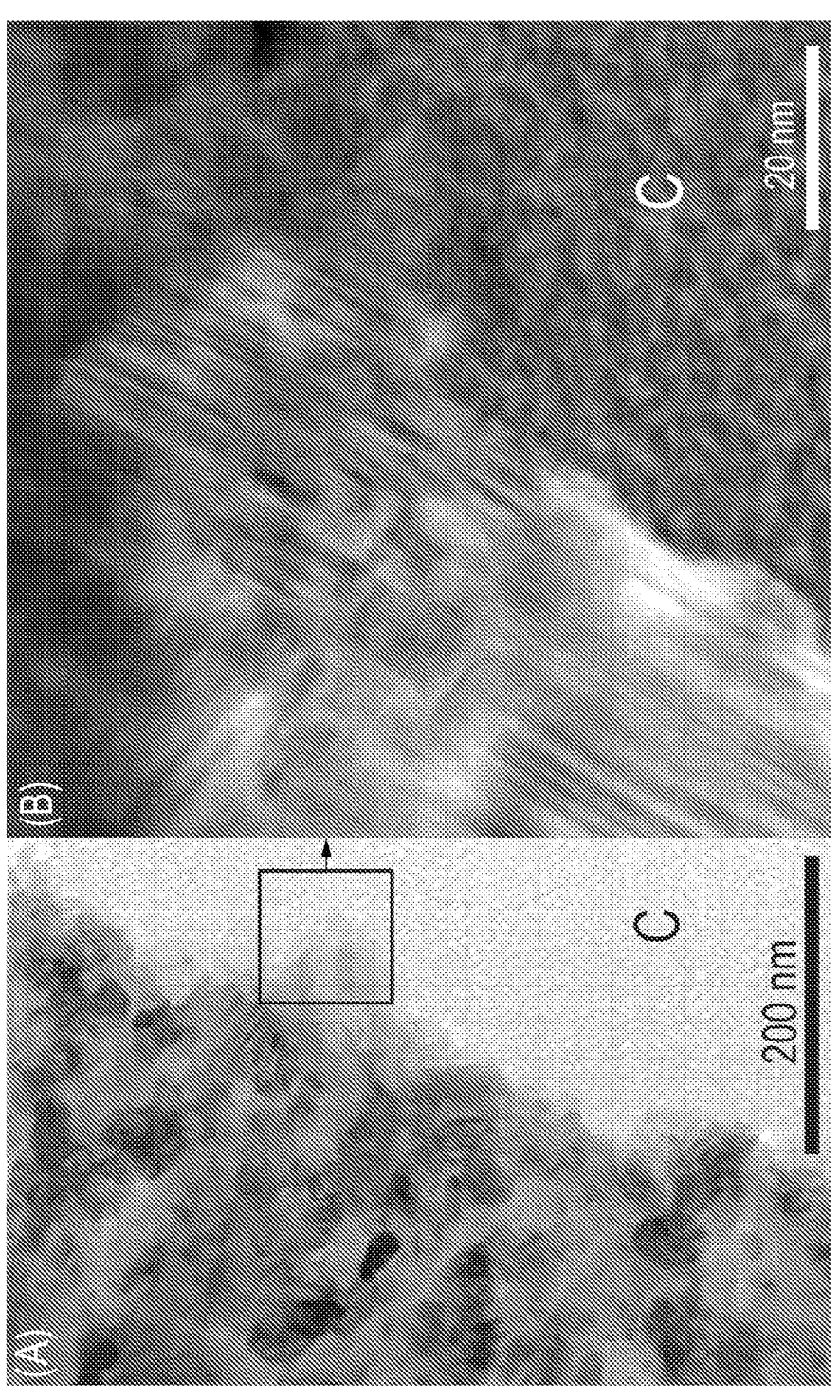
FIG. 13: Nanoscale pockets of Si intermixed with SiC are obtained at the interface between the evolving SiC and the unreacted carbon, as evidenced by (A) the TEM image of a specimen subjected to 1380° C./30 min in vapor followed by a Short exposure to an incipient melt. (B) A higher magnification dark field image of the interface reveals the formation of heavily-faulted SiC grains (left) in direct contact with amorphous C (right).

As the molten Si comes into contact with the pre-reacted particle surfaces, it not only rapidly wets the particles but also penetrates the pores within the SiC layers produced from the vapor (FIG. 3B). The melt intrusion is facilitated by the internal pore surfaces being coated with unreacted Si (FIG. 3A), as evidenced by the high Si:C ratios measured after vapor exposure but prior to melt exposure. The melt paths to the unreacted C are thus already established as a consequence of the vapor exposure. Capillarity would hinder de-wetting of the internal SiC surfaces, ensuring the immediate availability of Si in contact with the C to continue the reaction. Although melt channels are not identifiable at the reaction front, e.g. FIG. 13(A,B), they are clearly evident within the SiC layers some distance behind the reaction front, as in FIG. 12(C). The implication is that there was Si melt present at the reaction front at high temperature but that the Si closest to the C interface reacted in the early stages of cooling, leaving fine Si pockets among the nano-scale SiC grains further back from the front.

Without being bound by a particular scientific theory, the high density of faults in the SiC as it grows from the amorphous C, e.g. FIG. 13(C), suggests a ledge mechanism of growth. This would involve interface/boundary diffusion of both C and Si atoms to the growing front, and would be consistent with the frequent twinning and/or faulting of the structure. (The protruding section into the amorphous C suggest a possible contribution of screw dislocations in the generation of the steps, as found sometimes in CVD growth [12]). This could also explain why faulted grains evolve during both vapor exposure and subsequent melt exposure.

4.5. Implications for the Synthesis of CMC Matrices

The experimental results presented herein show that a Si vapor pre-conditioning of carbonaceous preform surfaces can circumvent the reactive wetting hindrance to melt infiltration by forming a wettable SiC surface. In turn, the wettable surface should accelerate melt flow and enable thicker sections to be fabricated. Moreover, a moderately porous SiC shell on the C surfaces delays the onset of further reaction with the melt, which would be controlled by melt ingress through the pores in the outer layers. This can obviate the choking phenomenon caused by SiC buildup in the narrowest channels in the pore network and expand the time available for infiltration.

This understanding of the vapor reactions can be used to design vapor conditioning processes for the formation of CMC matrices via reactive melt infiltration. Tradeoffs between the times and temperatures of exposure and the temperature capabilities of the fibers can be selected depending on the application. For example, a short vapor exposure at a relatively high temperature (say, just below the onset of Si melting) can be selected in order to achieve a larger content of nanoscale pores within the SiC. But this treatment may be detrimental to the fibers or the fiber coatings unless proper measures are taken. The time-temperature schedules in both the vapor and melt reaction stages should be moderated by the tolerance of the coated fiber preforms, especially with regard to possible contact of the melt with the protective layer, typically CVI SiC, usually added on top of the weak interface layer, typically BN. It has been reported that SiC can dissolve in molten Si and re-precipitate again [22], presumably with a different crystallographic form (e.g., $\alpha \rightarrow \beta$) or with a reduced defect density. The details of the reported reaction and products, however, have not been properly investigated. Because in these systems the driving force for the reaction of Si and C is arguably much larger than that for the dissolution of SiC, and the relative amount of Si is small compared with the coated fibers, this problem is probably not critical in the scenarios studied here, but needs to be understood for the implementation of this invention.

Alternatively, a lower temperature in combination with a longer vapor exposure time could be selected, enough to create a robust surface layer that would not detach when in contact with the melt, while not compromising fiber or coating properties.

Illustrative embodiments described herein use amorphous C as a precursor to the SiC reaction, which leads to the formation of pores upon reaction with the Si vapor. However, the experimental results presented herein and the computed reduction in volume associated with that reaction indicates that the same mechanism should be operative with graphitic precursors. In another example, the process can be implemented using polymeric precursors that are known to produce amorphous C[16, 21]. Additionally, strategies developed to engineer the architecture of the C could be employed to further enhance reaction with Si [8].

Advantages and Improvements

This present invention circumvents the critical problem of wettability of carbon and carbonaceous surfaces by Si-based melts in the fabrication of SiC-based CMCs by reactive melt infiltration. The crucial step is pre-conditioning of the carbon surfaces by exposure to Si vapor to form a thin layer of SiC that can be readily wetted by the melt. In combination with the appropriate selection of a Si-alloy melt for the subsequent infiltration, the invention can eliminate the presence of residual Si and residual voids from incomplete infiltration to enhance both the temperature capability of the CMC and increase its mechanical robustness. Specific benefits include:

(i) Reduced infiltration time: Infiltration occurs much more rapidly affording better control of the total processing time, with attendant benefits to the minimization of fiber degradation during processing.

(ii) Minimization of pore defects resulting from incomplete infiltration: The faster infiltration reduces the propensity for clogging of the flow pathways and thus reduces the amount of remnant porosity. Reduction of pore defects leads in turn to higher matrix cracking strengths and enhanced environmental robustness.

(iii) Flexibility in material utilization: In one or more examples, pure Si could be used to generate the vapor for preconditioning the surface, either incorporated in the matrix preform or from an external source, and then use of an appropriate Si alloy for the infiltration process. In addition, one could use a C:Si>1 to limit the amount of SiC formed from the vapor phase leaving sufficient porosity to enable subsequent melt infiltration.

(iv) Flexibility in selection of carbon sources: The carbon source for the formation of SiC can be in the form of either particles intermixed with SiC particles or as a carbon liquid precursor mixed in with the SiC particles, or it can be added by precursor infiltration and pyrolysis after the SiC particles have been infiltrated into the fiber preform. Proper selection of a C precursor and pyrolysis treatment can generate amorphous carbon which would benefit from the lessons learned in the experimental demonstration of the concept described earlier in this document.

Although the vapor-preconditioning of the pore surfaces would involve an additional processing step, the implicit cost could be offset by a reduction in time of the subsequent infiltration step and by improved quality and properties of the composite.

REFERENCES

The following references are incorporated by reference herein.

[1] F. W. Zok, "Ceramic-matrix composites enable revolutionary gains in turbine engine efficiency," *Am. Ceram. Soc. Bull.*, vol. 95, pp. 22-28, 2016.

[2] R. Naslain, "Design, preparation and properties of non-oxide CMCs for application in engines and nuclear reactors: An overview," *Compos. Sci Technol.*, vol. 64, pp. 155-170, 2004, doi: 10.1016/50266-3538(03)00230-6.

[3] G. S. Corman et al., "Rig and engine testing of melt infiltrated ceramic composites for combustor and shroud applications," *J. Eng. Gas Turbines Power*, vol. 124, pp. 459-464, 2002, doi: 10.1115/1.1455637.

[4] R. R, Naslain, "SiC-Matrix Composites: Nonbrittle ceramics for thermo-structural application," *Int. J. Appl. Ceram. Technol., vol.* 2, pp. 75-84, 2005.

[5] G. S. Corman and K. L. Luthra, "Silicon melt infiltrated ceramic composites (HiPerComp™)," in *Handbook of ceramics composites*, New Yotk: Springer Science+Business Media, 2005, pp. 99-115.

[6] C. A. Nannetti, A. Ortona, D. A. de Pinto, and B. Riccardi, "Manufacturing SiC-fiber-reinforced SiC matrix composites by improved CVI/Slurry Infiltration/Polymer Impregnation and Pyrolysis," *J. Am. Ceram. Soc* vol. 87, pp. 1205-1209, 2004.

[7] R. B. Reitz, F. W. Zok, and C. G. Levi, "Reactive alloy melt infiltration for SiC composite matrices: Mechanistic insights," *J. Am. Ceram. Soc.* vol. 100, pp. 5471-5481, 2017, doi: 101111/jace.15167.

[8] J. C. Margiotta, D. Zhang, D. C. Nagle, and C. E. Feeser, "Formation of dense silicon carbide by liquid silicon infiltration of carbon with engineered structure," *J. Mater. Res.*, vol. 23, pp. 1237-1248, 2008, doi: 10.1557/JMR.2008.0167.

[9] M. Singh and D. R. Behrendt, "Reactive melt infiltration of silicon-molybdenum alloys into microporous carbon preforms," *Mater. Sci. Eng. A*, vol. 194, pp. 193-200, 1995.

[10] R. B. Reitz, "Fundamentals of reactive alloy melt infiltration for robust SiC/SiC ceramic matrix composites. Doctoral dissertation in Materials, University of California, Santa Barbara," 2018.

[11] P. Serp, "Carbon," in *Comprehensive Inorganic Chemistry II*, J. Reedijk and K. Poeppelmeier, Eds. Elsevier Ltd, 2013, pp. 323-369.

[12] S. Schamm, A. Mazel, D. Dorignac, and J. Sdvely, "HREM identification of 'one-dimensionally-disordered' polytypes in the SiC (CVI) matrix of SiC/SiC composites,". *Microanal. Microstruct.*, vol. 2, pp. 59-73, 1991, doi: 10.1051/mmnm:019910020105900.

[13] R. N. Singk, "Kinetics model for the growth of silicon carbide by the reaction of liquid silicon with carbon," *J. Am. Ceram. Soc.*, vol. 78, pp. 2456-2462, 1995.

[14] J. C. Margiotta, D. Zhang, and D. C. Nagle, "Microstructural evolution during silicon carbide (SiC) formation by liquid silicon infiltration using optical microscopy," *Int. J Refract. Met. Hard Mater.*, vol. 28, pp. 191-197, 2010, doi: 10.1016/j ijrmhm.2009.09.002.

[15] R. Voytovych, R. Israel, N. Calderon, F. Hodaj, and N. Eustathopoulos, "Reactivity between liquid Si or Si alloys and graphite," *J. Eur. Ceram. Soc., vol.* 32, pp. 3825-3835, 2012, doi: 10.1016/j.jeurceramnsoc.2012.05.020.

[16] P. Sangsuwatn, J, A. Orejas, J. E. Catica, S. N. Tewari, and M. Singh, "Reaction-bonded silicon carbide by reactive infiltration," *Ind. Eng. Chem. Res.*, vol. 40, pp. 5191-5198, 2001, doi: 10.1021/ie001029e CCC.

[17] S. G. Davis, D. F. Anthrop, and A. W. Searcy, "Vapor pressure of silicon and the dissociation pressure of silicon carbide," *J Chem. Phys.*, vol. 34, pp. 659-664, 1961, doi: 10.1063/1.1701004.

[18] C. W. Bale et al., "FactSage thermochemical software and databases, 2010-2016," *Calphad Comput. Coupling Phase Diagrams Thermochem.*, vol. 54, pp. 35-53, 2016.

[19] R. P Messner and Y. M. Chiang, "Liquid-phase reaction-bonding of silicon carbide using alloyed silicon-molybdenum melts," *J. Am. Ceram. Soc., vol.* 73, pp. 1193-1200, 1990.

[20] D. L. Poerschke and C. G. Levi, "Yttrium bearing silicon carbide matrices for robust ceramic composites," *J. Am. Ceram. Soc.*, vol. 96, pp. 1300-1308, 2013, doi: 10.1111/jace.12133.

[21] M. Monthioux and O. Delverdier, "Thermal behavior of (organosilicon) polymer-derived ceramics. V: Main facts and trends," *J. Eur. Ceram. Soc.*, vol. 16, pp. 721-737, 1996, doi: 0955-2219/96/.

[22] Further information on one or more embodiments of the present invention can be found in Vapor-mediated melt infiltration for synthesizing SiC composite matrices, by Silverstein et. al., *J. Am Ceram Soc.* 2021; 00:1-12. DOI: 10.1111/jace.17793.

CONCLUSION

This concludes the description of the preferred embodiment of the present invention. The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of making a silicon carbide matrix, comprising: exposing internal surfaces of a porous composite preform, comprising carbon, to a vapor comprising silicon, wherein:

the carbon in the preform comprises carbon particles or solid carbon derived from pyrolysis of a liquid precursor;

the vapor comprising silicon adsorbs on the carbon surfaces and reacts with the carbon so as to form a nanoporous layer of silicon carbide (SiC) on the carbon; and a majority of the carbon under the nanoporous layer of SiC remaining after the vapor reaction being available for a subsequent reaction with a Si bearing reactive melt;

exposing the carbon preform surfaces modified with the nanoporous layer of (SiC) to the reactive melt comprising molten silicon, wherein the reactive melt infiltrates first the network of larger pores (passages) in the porous composite preform so as to wet or contact the silicon carbide on the inner surfaces of the pores and then through a network of nanopores in the nanoporous layer of SiC to react with the majority of the carbon so as to form additional silicon 20 carbide at the interfaces with the remaining carbon and eventually filling the entire network of pores including the pores in the network of nanopores.

2. The method of claim 1, further comprising:

assembling the porous composite preform including, in the preform, SiC fibers, and a SiC particulate filler combined with the carbon particles, wherein the porous composite preform comprises the larger pores, comprising interconnected passages, for the permeation of the vapor comprising silicon.

3. The method of claim 2, wherein the porous composite preform further comprises silicon particles, the method further comprising heating the porous body so as to vaporize the silicon particles and form the vapor.

4. The method of claim 1, wherein the carbon comprises amorphous carbon, graphitic carbon or turbostratic carbon derived from pyrolysis of carbon precursors such as, for example, resins or pitch.

5. The method of claim 1, wherein:

the vapor comprises pure silicon and the melt comprises a Si-based alloy wherein silicon is the major component of the alloy.

6. The method of claim 1, wherein the vapor is provided from an external source or by vaporizing discrete small silicon particles incorporated in the preform.

7. The method of claim 1, wherein:

the network of pores comprising nanopores are formed within the thin SiC layers on the carbon surfaces by volume contraction resulting from the carbon reacting with the vapor; and the nanopores interpenetrate the silicon carbide layer initially formed from the vapor reaction and are connected to the interface with the carbon remaining available for the reaction with the reactive melt.

8. The method of claim 1, further comprising controlling a reaction rate of the vapor with the carbon surfaces so as to form the network of nanopores while preventing the silicon carbide synthesized from the vapor reaction from blocking the pores.

9. The method of claim 8, wherein controlling the reaction rate comprises controlling a temperature and duration of the vapor phase reaction so as to expose the outer surfaces to the vapor at one or more temperatures below a melting temperature of the silicon and for the & duration, such that a thickness of the silicon carbide synthesized using the vapor does not block the pores.

10. The method of claim 9, wherein the temperature is 20-100K below the melting temperature of the silicon, wherein for the temperature of 20K the duration is 2 hours or less and for the temperature of 100 K the duration is 4 hours or less.

11. The method of claim 1, further comprising controlling an oxygen content during the exposing to promote formation of SiO (monoxide) gas by reaction with the silicon, which can contribute to the availability of the silicon in the vapor that reaches the carbon; and reducing the temperature by taking into account reaction of the carbon with the silicon in the SiO.

12. The method of claim 1, wherein:

the vapor uniformly infiltrates an entirety of the passages in the porous carbon bearing preform through interconnections between the passages, and the melt uniformly infiltrates an entirety of the nanopores in the porous layer created by the reaction with the vapor through interconnections between the network of nanopores.

13. The method of claim 1, wherein the nanoporous layer comprises elongated grains of silicon carbide bounding the network of nanopores.

14. The method of claim 1, further comprising forming a SiC-based ceramic matrix composite (CMC) using the silicon carbide matrix, wherein the composite comprises ceramic fibers combined with the matrix.

15. The method of claim 1, wherein:

the nanoporous layer comprises elongated grains of silicon carbide bounding the network of nanopores, the elongated grains have average widths in the range of 100 nm-200 nm and an aspect ratio approximately in a range of 8-12, and the matrix comprises less than 5% residual carbon and less than 5% residual silicon after the reaction is completed.

*   *   *   *   *